United States Patent
Pärssinen et al.

(10) Patent No.: US 8,886,253 B2
(45) Date of Patent: Nov. 11, 2014

(54) METHOD TO CONTROL A MULTIRADIO RF PLATFORM

(75) Inventors: Aarno Pärssinen, Espoo (FI); Antti Immonen, Helsinki (FI)

(73) Assignee: Nokia Corporation, Espoo (FI)

(*) Notice: Subject to any disclaimer, the term of this patent is extended or adjusted under 35 U.S.C. 154(b) by 491 days.

(21) Appl. No.: 12/698,355

(22) Filed: Feb. 2, 2010

(65) Prior Publication Data

US 2011/0190029 A1 Aug. 4, 2011

(51) Int. Cl.
- *H04M 1/00* (2006.01)
- *H04W 88/06* (2009.01)
- *H04B 1/00* (2006.01)
- *H04W 8/22* (2009.01)
- *H04W 48/18* (2009.01)

(52) U.S. Cl.
CPC ............... *H04W 88/06* (2013.01); *H04W 8/22* (2013.01); *H04B 1/0028* (2013.01); *H04W 48/18* (2013.01)
USPC ...................... 455/552.1; 455/553.1; 370/328

(58) Field of Classification Search
USPC ................................ 455/552.1, 553; 370/328
See application file for complete search history.

(56) References Cited

U.S. PATENT DOCUMENTS

| | | |
|---|---|---|
| 2008/0002623 A1 | 1/2008 | Piipponen et al. |
| 2008/0004070 A1 | 1/2008 | Piipponen et al. |
| 2008/0139213 A1 | 6/2008 | Coersmeier |
| 2008/0293445 A1 | 11/2008 | Piippponen et al. |
| 2009/0154534 A1 | 6/2009 | Hassan |
| 2009/0170444 A1 | 7/2009 | Retnasothie et al. |
| 2010/0008291 A1* | 1/2010 | LeBlanc et al. ............... 370/328 |

FOREIGN PATENT DOCUMENTS

| | | |
|---|---|---|
| KR | 2008/0052176 A | 6/2008 |
| WO | WO2009109687 | 9/2009 |

OTHER PUBLICATIONS

H.Darabi et al. A dual-mode 802.11b/Bluetooth Radio in 0.35um CMOS. IEEE Journal of Solid-State Circuits, 40, No. (3):698-706, Mar. 2005.

V. Aparin et al. A Fully-Integrated Highly Linear Zero-IF CMOS Cellular CDMA Receiver. ISSCC Digest of Technical Papers, pp. 324-325, Feb. 2005.

(Continued)

*Primary Examiner* — Wayne Cai
*Assistant Examiner* — Chuck Huynh
(74) *Attorney, Agent, or Firm* — Locke Lord LLP

(57) ABSTRACT

Method, apparatus, and computer program product example embodiments are disclosed for cognitive radio systems and methods employing software defined radio techniques to control and configure multiradio hardware in wireless communications. The example embodiments provide a virtualized RF platform for RF configuration and system level performance optimization. The example embodiments may be flexibly distributed between system, protocol, and hardware dependent functions. The example embodiments enable transport independent usage of RF to support multiple concurrent data flows and to support local decisions as to which protocols to use to fulfill application level connectivity demands. The example embodiments allow mutual assistance in protocol selection, independent of the underlying platform implementation. The example embodiments provide a hardware control scheme using a hardware manager, a cognitive hardware engine, resource allocation, and resource performance estimation to enable a logical separation of implementation dependent functions from protocol stacks. The example embodiments may be described by means of a layered structure that allows local optimization and efficient resource sharing and that has all needed functionalities required for generalizing the control of virtually any kind of RF operation, including cognitive radio applications.

12 Claims, 19 Drawing Sheets

(56) References Cited

OTHER PUBLICATIONS

Yi Peng et al., "A Cross-Layer Architecture for OFDMA-Based Cognitive Radio Network", Software Engineering, 2009, WCSE '09, WRI World Congress on, IEEE, Piscataway, NJ, WSA, May 19, 2009, pp. 129-133, XP031562058.
Extended European Search Report for European Application No. 11151521.9.-2411 dated May 26, 2011, 10 pp.

* cited by examiner

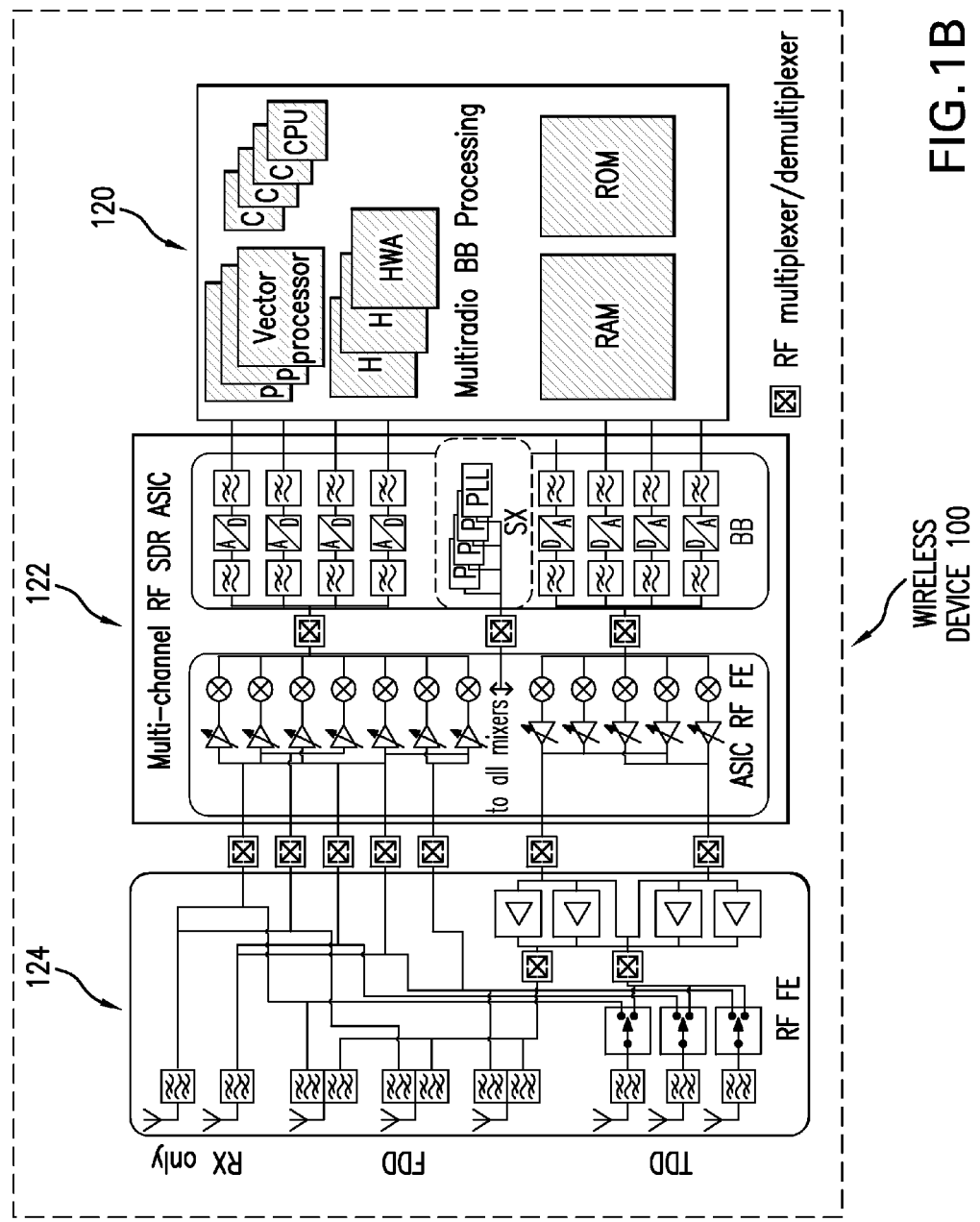

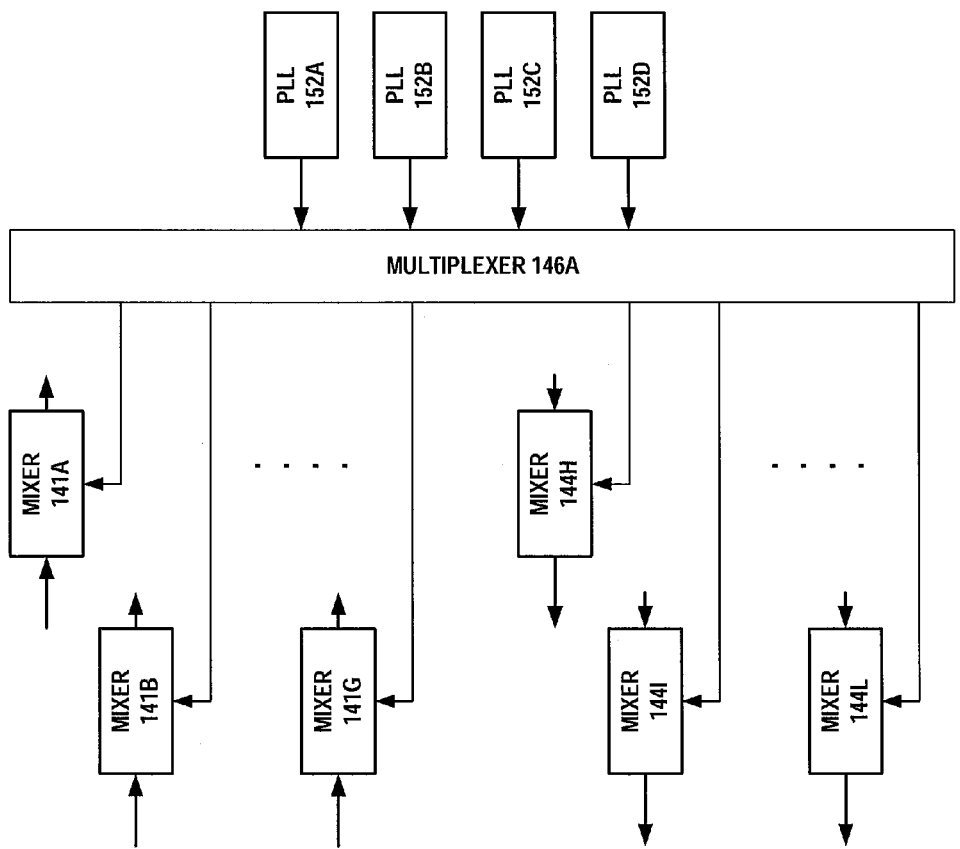

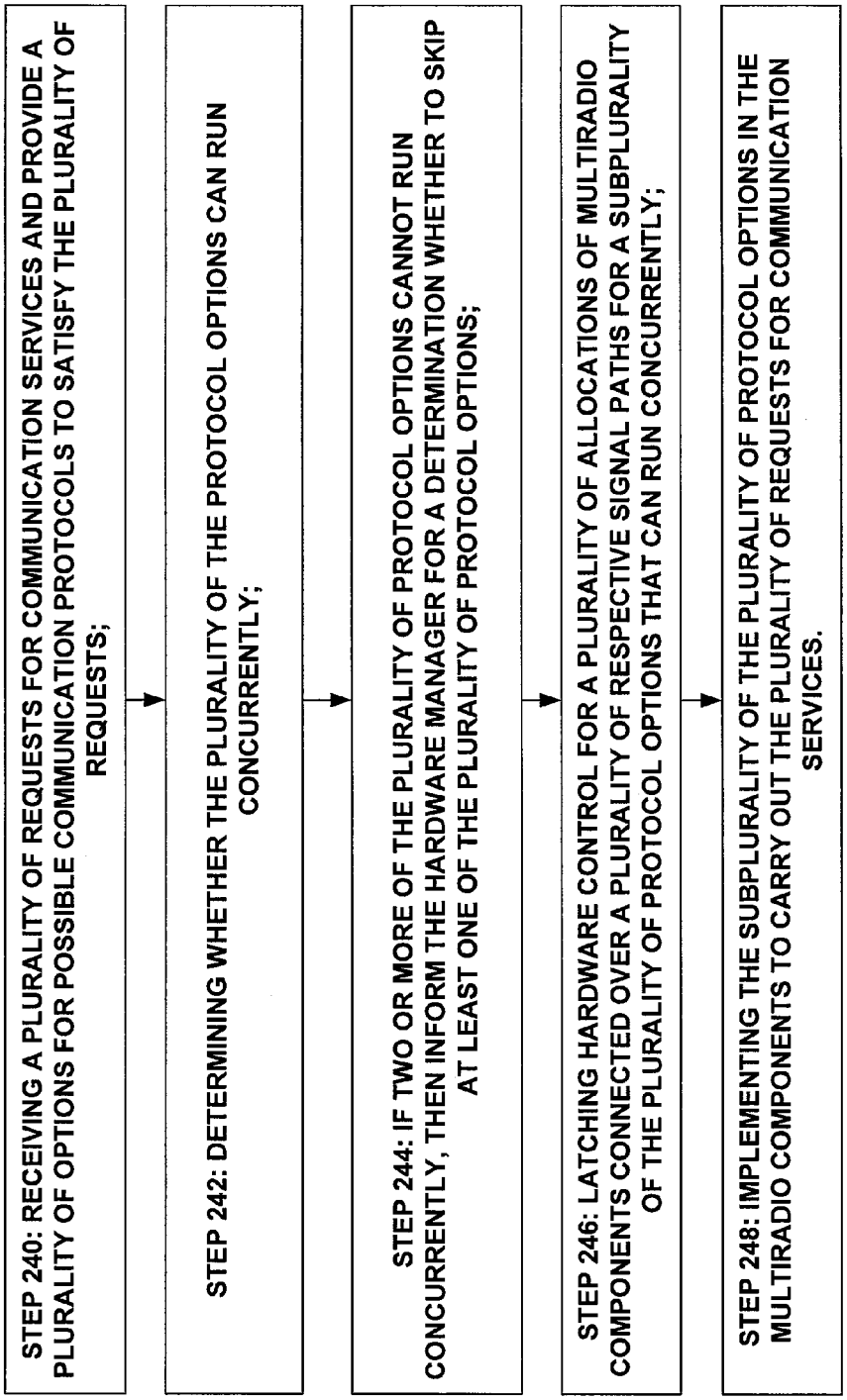

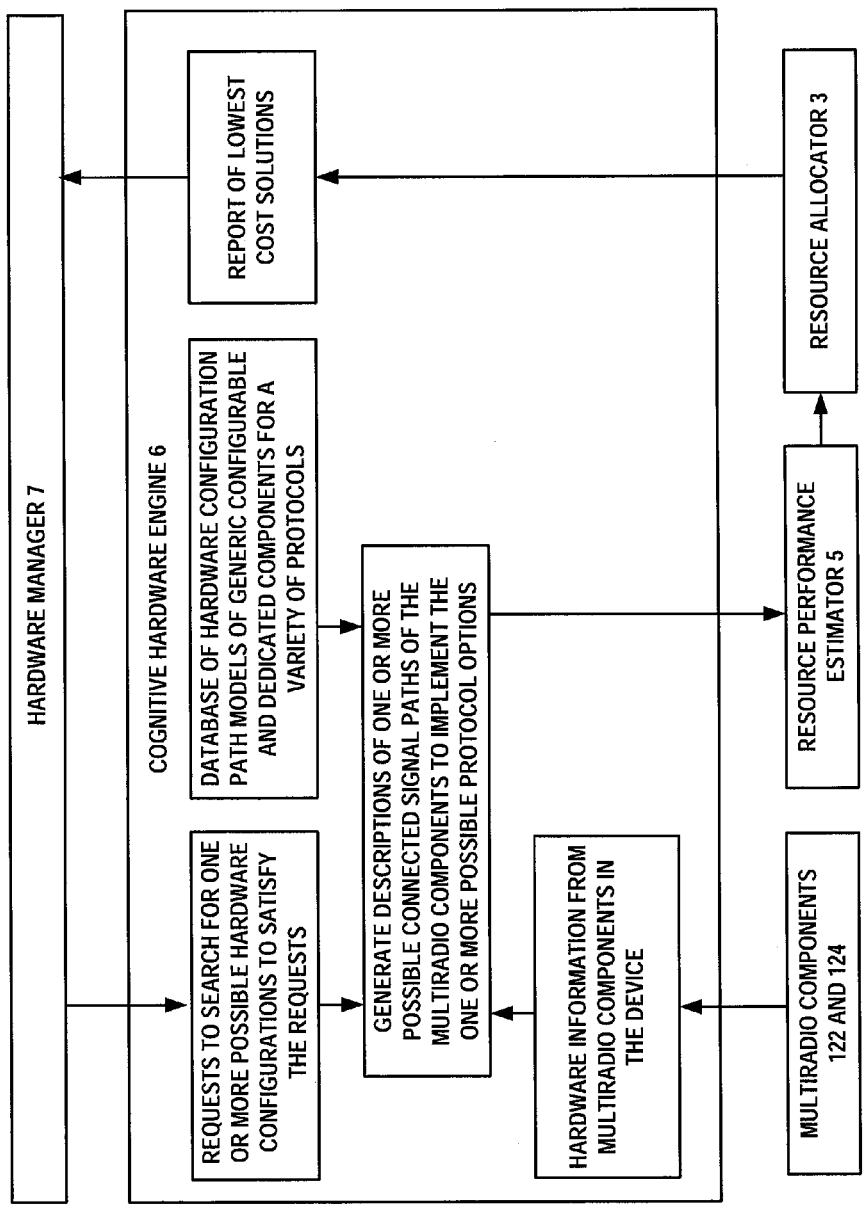

METHOD TO CONTROL A MULTIRADIO RF PLATFORM

FIELD

The technical field relates to wireless communications. More particularly, the technical field relates to cognitive radio systems and methods employing software defined radio techniques to control and configure multiradio hardware in wireless communications.

BACKGROUND

Multiradio mobile devices typically include several different wireless subsystems that enable the use of diverse mobile services, such as the communication of voice, data, and images over diverse wireless networks. Examples of such diverse wireless networks include mobile telephony networks (e.g., Universal Mobile Telecommunications System (UMTS), Global System for Mobile Communication (GSM)), wireless local area networks (WLANs) and WiFi networks, and piconets (e.g., Bluetooth). An example multiradio device may have one radio for voice (or combined voice/data) service over a traditional cellular network and another radio for data communications over another network (e.g., WLAN). A multiradio device may have a WLAN radio for communication with a WLAN access point, a Bluetooth radio for communication with a Bluetooth enabled printer or headset, and a traditional voice service over a cellular telephone radio. A multiradio device may have a GSM radio and a digital video broadcast for handhelds (DVB-H) radio. A multiradio device may have more than one radio for communicating over different cellular telephone networks, such as a mobile telephone having two cellular radios for use with different types of networks in different countries.

Software Defined Radio (SDR) is typically a multiradio mobile device that is controlled by embedded control software. Some of the hardware components of a multiradio device may have their characteristics adjusted by SDR control software. The tuning capabilities in an example SDR may include RF band, RF bandwidth and channel bandwidth. Also, performance related parameters, such as gain and output power affecting for example noise and linearity may be tuned by control software making adjustments to hardware components to accommodate different wireless protocols and different radio conditions.

Cognitive radio is an intelligent wireless communication system that can be based on software-defined radios, which monitors the environment and adapts to variations in input signals, to improve the reliability of communication and the efficient use of the radio spectrum. When a user requests a task, such as a voice call, a data download, location tracking etc., the cognitive radio may aid the selection of the most suitable technology, such as GSM, WLAN, Bluetooth, or the like. Cognitive radio may more efficiently use the radio spectrum because a mobile device may scan the environment, determine the best or preferred frequency band and transmission standard, and indicate its preferences by signaling other cognitive radio devices with its preferred transmit power, channel equalization and coding scheme.

SUMMARY

Method, apparatus, and computer program product example embodiments of the invention are disclosed for cognitive radio systems and methods employing software defined radio techniques to control and configure multiradio hardware in wireless communications. The example embodiments provide a virtualized RF platform for RF configuration and system level performance optimization. The example embodiments may be flexibly distributed between system, protocol, and hardware dependent functions. The example embodiments enable transport independent usage of RF to support multiple concurrent data flows and to support local decisions as to which protocols to use to fulfill application level connectivity demands. The example embodiments allow mutual assistance between communicating nodes in protocol selection, independent of the underlying platform implementation. The example embodiments provide a hardware control scheme using a hardware manager, a cognitive hardware engine, resource allocation, and resource performance estimation to enable a logical separation of implementation dependent functions from communication protocol stacks. The example embodiments may be described by means of a layered structure that allows local optimization and efficient resource sharing and that has all needed functionalities required for generalizing the control of virtually any kind of RF communications operation, including cognitive radio applications.

Example embodiments of the invention may include a wireless communications device that may have the following components.

At least one radio transmitter and/or receiver is included in the wireless communications device.

A hardware manager in the wireless communications device, is configured to receive information about ambient wireless communication protocols and receive one or more requests for communication services, and further configured to provide one or more options for possible communication protocols to satisfy the requests.

A cognitive hardware engine in the wireless communications device, is configured to obtain hardware information from multiradio components in the device and receive from the hardware manager the one or more protocol options concerning the one or more requests, the cognitive hardware engine further configured to generate descriptions of one or more possible connected signal paths of the multiradio components to implement the one or more protocol options and request one or more performance estimates of the one or more signal paths of the multiradio components.

A resource performance estimator in the wireless communications device, is configured to receive the request for one or more performance estimates from the cognitive hardware engine and to provide performance estimates for the one or more signal paths of the multiradio components.

A resource allocator in the wireless communications device, is configured to receive the performance estimates for the one or more signal paths of the multiradio components and to select one or more of the signal paths based on the requested performance estimates, the resource allocator further configured to provide to the cognitive hardware engine an allocation of the multiradio components for the selected one or more signal paths;

The cognitive hardware engine is further configured to receive the allocation of the multiradio components for the selected one or more signal paths and further configured to identify to the hardware manager which of the one or more protocol options corresponds to the selected one or more signal paths.

The hardware manager is further configured to confirm the one or more protocol options identified by the cognitive hardware engine as corresponding to the selected one or more signal paths to be implemented by the allocation of the multiradio components.

Example embodiments of the invention may further include the following components.

The hardware manager is further configured to confirm to the cognitive hardware engine, the one or more protocol options corresponding to the selected one or more signal paths to be implemented by the allocation of the multiradio components.

The cognitive hardware engine is further configured to grant permission for the allocation of the multiradio components for the one or more selected protocols.

The resource allocator is further configured to receive from the cognitive hardware engine the grant of permission for allocation of the multiradio components and to generate a command to use the allocation of the multiradio components.

A performance adjuster in the wireless communications device, is configured to receive the command from the resource allocator and to make local adjustments in the allocated multiradio components to optimize performance.

A protocol level hardware control in the wireless communications device, is configured to receive the command from the resource allocator and to latch hardware control based on the commands for the allocated multiradio components.

The allocated multiradio components are configured to receive the latched hardware control and to implement the one or more protocol options corresponding to the selected one or more signal paths to carry out the one or more requests for communication services.

Example embodiments of the invention may further include the following components.

The hardware manager is further configured to receive a plurality of requests for communication services and to provide options for possible communication protocols to satisfy the plurality of requests.

A multiradio timing module in the wireless communications device, is configured to receive from the resource allocator a plurality of allocations of the multiradio components connected over a plurality of selected signal paths to satisfy the plurality of requests and to determine whether the plurality of selected signal paths can run concurrently and configured to provide the resulting determination to the resource allocator. If two or more of the plurality of protocol options cannot run concurrently, then the hardware manager may be configured to determine whether to skip at least one of the plurality of protocol options.

The protocol level hardware control is further configured to receive commands from the resource allocator and to latch hardware control based on the commands for the plurality of allocations of multiradio components connected over the plurality of respective signal paths.

The allocated multiradio components are further configured to receive the latched hardware control and to implement the plurality of selected signal paths to carry out the plurality of respective requests for communication services.

Example embodiments of the invention may further include the following components.

The cognitive hardware engine, resource performance estimator, multiradio timing module, resource allocator, performance adjuster, protocol level hardware control, and a hardware abstraction layer in the wireless communications device are embodied as a cognitive platform control stack, and along with the hardware manager, are embodied in program code as a virtualization stack in a memory of the wireless device. The virtualization stack is divided into eight layers, each having a well-defined role. The topmost layer is the hardware manager that manages the lower layers of the cognitive platform control stack part of the virtualization stack. The bottom layer is the RF hardware abstraction layer that is implemented in program code between the physical multiradio hardware components and the protocol level hardware control program code. The function of the hardware abstraction layer is to hide details in hardware from the protocol level hardware control, so that the upper layers of the cognitive platform control stack do not need to be changed to run different multiradio hardware components.

Example embodiments of the invention may include a wireless communications method that may have the following steps:

Receiving information about ambient wireless communication protocols, receiving one or more requests for communication services, and providing one or more options for possible communication protocols to satisfy the requests, in a wireless communications device;

Obtaining hardware information from multiradio components in the device, generating descriptions of one or more possible connected signal paths of the multiradio components to implement the one or more protocol options, and requesting one or more performance estimates of the one or more signal paths of the multiradio components;

Providing performance estimates for the one or more signal paths of the multiradio components;

Selecting one or more of the signal paths based on the requested performance estimates, implementing a selected one or more protocol options and providing an allocation of the multiradio components for the selected one or more protocol options;

Confirming the selected one or more protocol options corresponding to the selected one or more signal paths to be implemented by the allocation of the multiradio components, and Configuring the selected one or more signal paths with the allocation of the multiradio components to implement the confirmed one or more protocol options.

Example embodiments of the method of the invention may further include the following steps:

Making local adjustments in the allocated multiradio components to optimize performance;

Latching hardware control for the allocated multiradio components; and

Implementing the confirmed one or more protocol options in the multiradio components to carry out the one or more requested for communication services.

Example embodiments of the method of the invention may further include the following steps:

Receiving a plurality of requests for communication services and provide a plurality of options for possible communication protocols to satisfy the plurality of requests;

Determining whether the plurality of the protocol options can run concurrently;

If two or more of the plurality of protocol options cannot run concurrently, then skipping at least one of the plurality of protocol options;

Latching hardware control for a plurality of allocations of multiradio components connected over a plurality of respective signal paths for a subplurality of the plurality of protocol options that can run concurrently; and Implementing the subplurality of the plurality of protocol options in the multiradio components to carry out the plurality of requests for communication services.

Example embodiments of the invention may include a computer readable medium storing program instructions, which when executed by a computer processor, perform the steps of the above recited method.

Example embodiments of the invention may include a wireless communications apparatus that may have the following components.
  at least one radio transmitter and/or receiver;
  at least one processor;
  at least one memory including computer program code;
  the at least one memory and the computer program code configured to, with the at least one processor, cause the apparatus at least to:
    receive information about ambient wireless communication protocols, receive one or more requests for communication services, and provide one or more options for possible communication protocols to satisfy the requests, in a wireless communications device;
    obtain hardware information from multiradio components in the device, generate descriptions of one or more possible connected signal paths of the multiradio components to implement the one or more protocol options, and request one or more performance estimates of the one or more signal paths of the multiradio components;
    provide performance estimates for the one or more signal paths of the multiradio components;
    select one or more of the signal paths based on the requested performance estimates, implementing a selected one or more protocol options and provide allocation of the multiradio components for the selected one or more protocol options;
    confirm the selected one or more protocol options corresponding to the selected one or more signal paths to be implemented by the allocation of the multiradio components, and
    configure the selected one or more signal paths with the allocation of the multiradio components to implement the confirmed one or more protocol options.

The at least one memory and the computer program code are further configured to, with the at least one processor, cause the apparatus at least to:
  make local adjustments in the allocated multiradio components to optimize performance;
  latch hardware control for the allocated multiradio components; and
  implement the confirmed one or more protocol options in the multiradio components to carry out the one or more requested for communication services.

The at least one memory and the computer program code are further configured to, with the at least one processor, cause the apparatus at least to:
  receive a plurality of requests for communication services and provide a plurality of options for possible communication protocols to satisfy the plurality of requests;
  determine whether the plurality of the protocol options can run concurrently;
  if two or more of the plurality of protocol options cannot run concurrently, then skip at least one of the plurality of protocol options;
  latch hardware control for a plurality of allocations of multiradio components connected over a plurality of respective signal paths for a subplurality of the plurality of protocol options that can run concurrently; and
  implement the subplurality of the plurality of protocol options in the multiradio components to carry out the plurality of requests for communication services.

The at least one memory includes computer program code to implement a hardware manager, cognitive hardware engine, resource performance estimator, multiradio timing module, resource allocator, performance adjuster, protocol level hardware control, and a hardware abstraction layer embodied as a virtualization stack.

The resulting embodiments to enable dynamic configuration of multiradio RF platforms to support multiple concurrent data flows.

DESCRIPTION OF THE FIGURES

A more complete understanding of the example embodiments of the invention is made with reference to the following figures.

FIG. 1B illustrates an example functional block and circuit diagram of the wireless device 100 organized into three sections: the multiradio baseband processing section 120, the multichannel RF SDR ASIC section 122, and the RF front-end section 124.

FIG. 1H illustrates an example functional block diagram of the selective connections between the phase locked loops (PLL) 152A-152D and the mixers 141A-141G and 144H-144L through the multiplexer 146A of the multichannel RF SDR ASIC 122 of FIG. 1D.

FIG. 2C illustrates an example flowchart 200'' that continues the flow chart 200' of FIG. 2B, depicting an example the procedure carried out by the wireless device 100 to satisfy a plurality of concurrent requests to establish a plurality of allocations of the multiradio components connected over a plurality of respective signal paths for a plurality of respective selected protocols to satisfy the plurality of respective requests.

FIG. 3E illustrates an example functional block diagram of the cognitive hardware engine 6.

DISCUSSION OF EXAMPLE EMBODIMENTS OF THE INVENTION

Method, apparatus, and computer program product example embodiments are disclosed for cognitive radio systems and methods employing software defined radio techniques to control and configure multiradio hardware in wireless communications. The example embodiments provide a virtualized RF platform for RF configuration and system level performance optimization. The example embodiments may be flexibly distributed between system, protocol, and hardware dependent functions. The example embodiments enable transport independent usage of RF to support multiple concurrent data flows and to support local decisions as to which protocols to use to fulfill application level connectivity demands. The example embodiments allow mutual assistance between communicating nodes in protocol selection, independent of the underlying platform implementation. The example embodiments provide a hardware control scheme using a hardware manager, a cognitive hardware engine, resource allocation, and resource performance estimation to enable a logical separation of implementation dependent functions from communication protocol stacks. The example embodiments may be described by means of a layered structure that allows local optimization and efficient resource sharing and that has all needed functionalities required for generalizing the control of virtually any kind of RF communications operation, including cognitive radio applications.

Figure 1A:
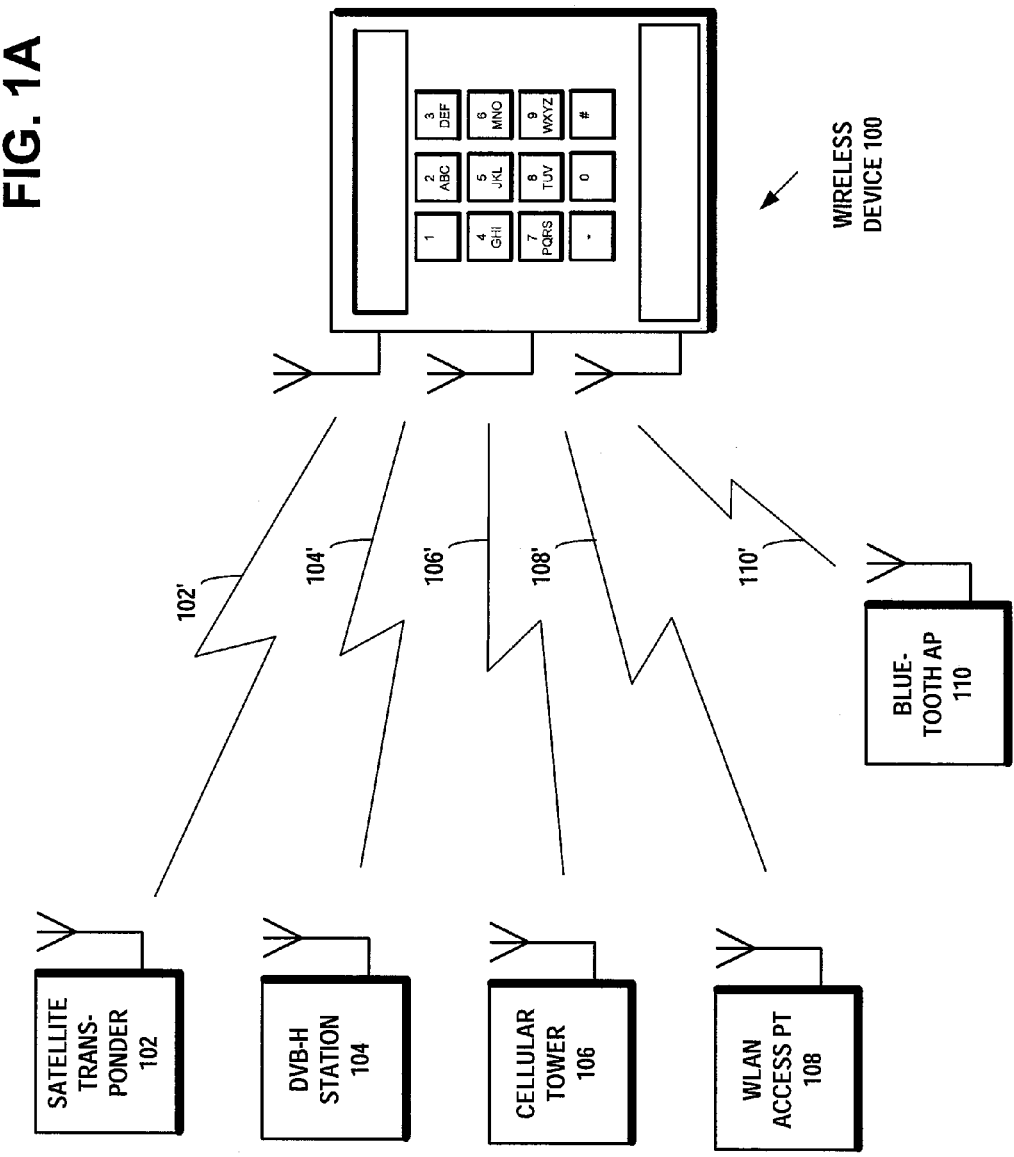
FIG. 1A illustrates an example embodiment of a wireless device 100 in a location having an ambient radio frequency environment produced by a satellite transponder 102, a DVB-H station 104, a cellular tower 106, a WLAN access point 108, and a Bluetooth access point 119.

FIG. 1A illustrates an example embodiment of a wireless device 100 in a location having an ambient radio frequency environment 102', 104', 106', 108', and 110' produced by a satellite transponder or global positioning satellite (GPS) 102, a DVB-H station 104, a cellular tower 106, a WLAN access point 108, and a Bluetooth access point 110. It is not uncommon in these days of ubiquitous wireless communications, to find an area having such a diverse ambient radio frequency environment. When an application a requests communication services from the wireless device 100, the example embodiments gather information about ambient wireless communication protocols, select an appropriate protocol for the requested communication, and configure the multiradio hardware components in the wireless device 100 for optimum performance in the requested communications session. The example embodiments can handle a requested communications service that involves two or more concurrent sessions using two or more communications protocols, such as downloading a file over a GSM cellular telephone network and transferring the downloaded file via a Bluetooth link to a personal computer. The example embodiments select communication protocols that can be run concurrently for the requested communications and configure the multiradio hardware components in the wireless device 100 to handle the two or more concurrent sessions.

FIG. 1B illustrates an example functional block diagram and an example circuit diagram of the wireless device 100 organized into three sections: the multiradio baseband processing section 120, the multichannel radio frequency (RF) software defined radio (SDR) application-specific integrated circuit (ASIC) section 122, and the RF front-end section 124. The ASIC is an integrated circuit customized to perform the functions of the multichannel radio frequency software defined radio.

Figure 1C:
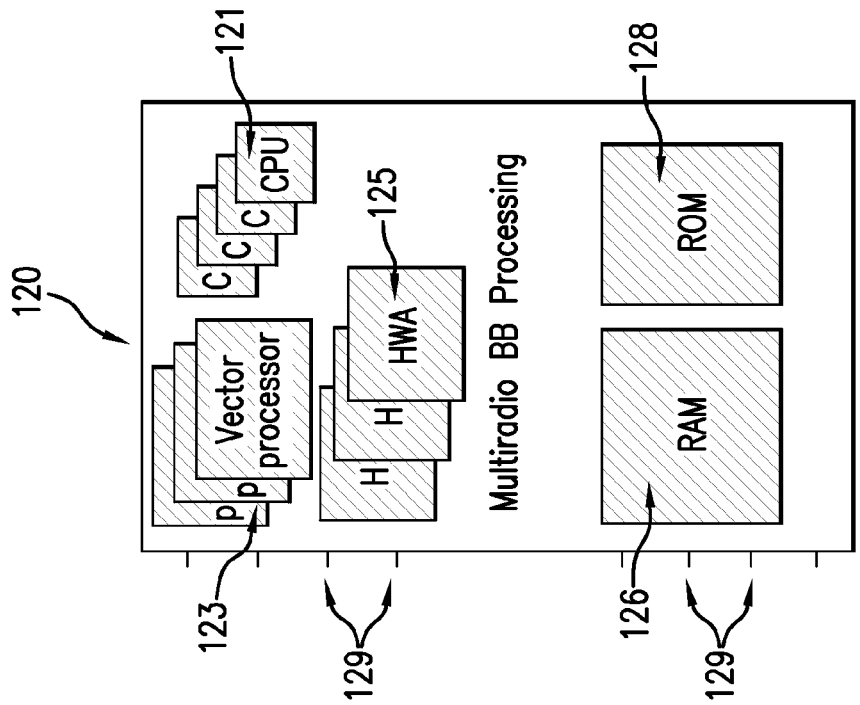
FIG. 1C illustrates an example functional block diagram of the multiradio baseband processing section 120 of the wireless device 100.

FIG. 1C illustrates an example functional block diagram and an example circuit diagram of the multiradio baseband processing section 120. It includes one or more central processor units (CPUs) 121, one or more vector processors 123 to handle repetitive, parallel, baseband processing algorithms, one or more hardware accelerators (HWAs) 125, a random access memory (RAM) 126, and a read only memory (ROM) 128 or a programmable read only memory. The hardware accelerators 125 are hardware processors that have direct access to the memory and can handle extremely high bandwidth through parallel transactions to multiple buffers. They perform computationally intensive software code faster than a CPU executing software instructions, in applications such as high-speed packet processing and motion estimation in MPEG2. The baseband processing section 120 may also include interface circuits to interface with a key pad, display, optional microphone, speakers, ear pieces, and camera or other imaging devices, etc. The CPU processors 121 are programmed with computer program instructions stored in the memory, RAM 126 and/or ROM 128, to operate in accordance with the example processes depicted in the flow diagrams 200, 200' and 200" of FIGS. 2A, 2B, and 2C, respectively. The memory, RAM 126 and/or ROM 128 in the multiradio baseband processing section 120, also stores an example cognitive platform control (CPC) stack 300 and the hardware manager 7 shown in FIGS. 3A and 3B.

Figure 1D:
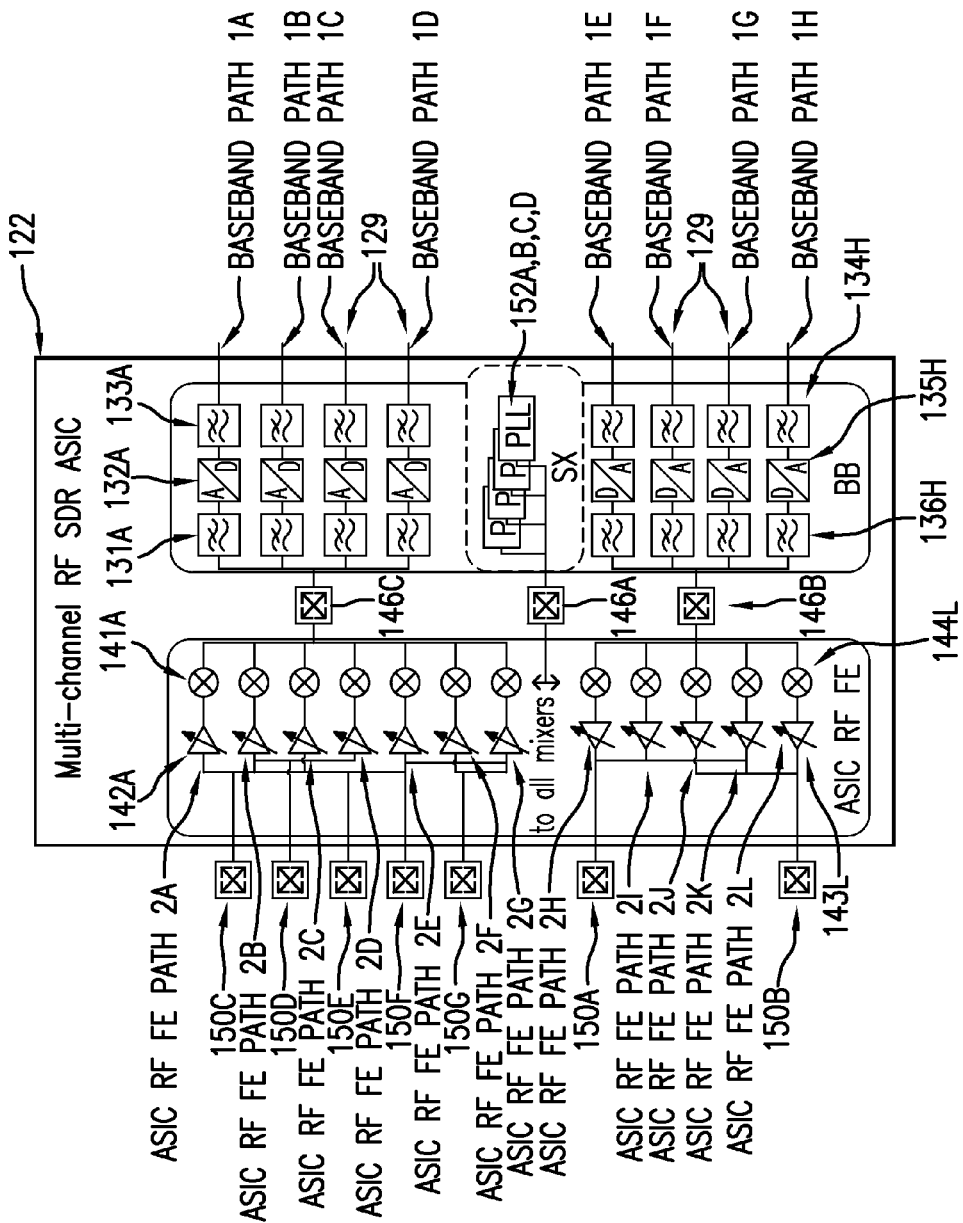
FIG. 1D illustrates an example circuit diagram of the multichannel RF SDR ASIC section 122 of the wireless device 100.

FIG. 1D illustrates an example circuit diagram of the multiradio components in the multichannel RF SDR ASIC section 122 of the wireless device 100. Example multiradio components in the multichannel RF SDR ASIC section 122 include ASIC RF front-end paths 2A to 2L connected to multiplexers 150A to 150G and baseband paths 1A to 1H connected to lines 129 from the multiradio baseband processing section 120. ASIC RF front-end paths 2A to 2G are receive paths and include variable amplifiers such as 142A and mixers such as 141A to remove the RF carrier frequency from the received signal by mixing it with a reference signal from a selected one of the phase locked loop circuits 152A, 152B, 152C, or 152D, selected with the multiplexer 146A, as shown in FIG. 1H. The multiplexer 146C selectively steers the down-converted signal to one of the baseband paths 1A to 1D. Baseband paths 1A to 1D are receive paths and include RF filters such as 131A, analog-to-digital converters such as 132A, and digital filters such as 133A. Each of the amplifiers, filters, multiplexers, and analog-to-digital converters may have its characteristics selectively adjusted by the hardware abstraction layer (HAL) 0 and the protocol level hardware control 1 of the cognitive platform control stack 300 in the multiradio baseband processing section 120.

FIG. 1D also illustrates example multiradio components in the transmit paths of the multichannnel RF SDR ASIC section 122 of the wireless device 100. Baseband paths 1E to 1H are transmit paths and include a digital filter such as 134H, a digital-to-analog converter such as 135H, and a RF filter such as 136H. The multiplexer 146B selectively steers the converted analog signal to one of the ASIC RF front-end paths 2H to 2L. ASIC RF front-end paths 2H to 2L are transmit paths and include variable amplifiers such as 143L and mixers such as 144L to add the RF carrier frequency to the signal to be transmitted by mixing it with a reference signal from a selected one of the phase locked loop circuits 152A, 152B, 152C, or 152D, selected with the multiplexer 146A, as shown in FIG. 1H. Each of the amplifiers, filters, multiplexers, and digital-to-analog converters may have its characteristics selectively adjusted by the hardware abstraction layer 0 and the protocol level hardware control 1 of the cognitive platform control stack 300 in the multiradio baseband processing section 120.

Figure 1E:
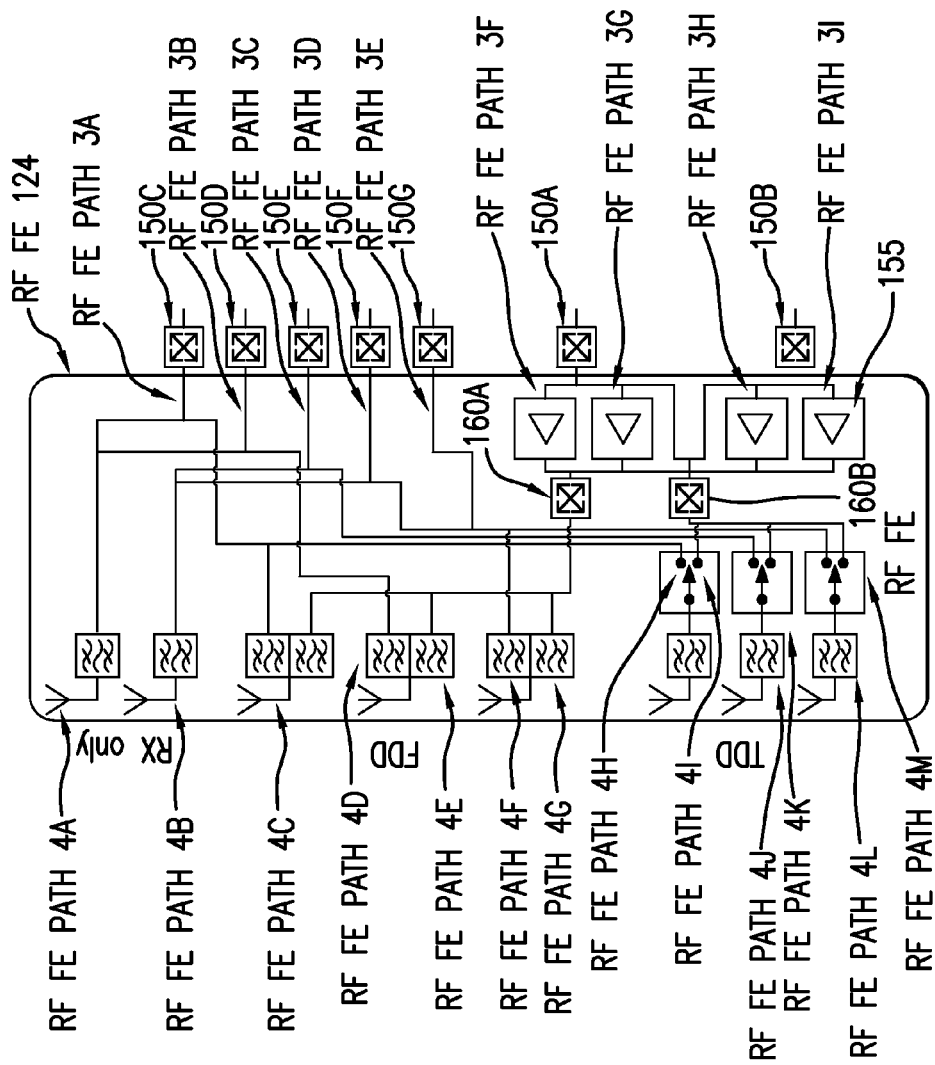
FIG. 1E illustrates an example circuit diagram of the RF front-end section 124 of the wireless device 100.

FIG. 1E illustrates an example circuit diagram of the multiradio components in the RF front-end section 124 of the wireless device 100. The various paths of the RF front-end section 124 are selectively connected to the various paths of the RF SDR ASIC section 122 by the multiplexers 150A to 150G controlled by the hardware abstraction layer 0 and the protocol level hardware control 1 of the cognitive platform control stack 300. The transmit paths 3F to 3I include an amplifier such as 155. For example, the transmit paths 3F to 3I are selectively steered to the FDD paths 4E and 4G and their respective transmitters by the multiplexer 160A for frequency division duplex (FDD) communication. The transmit paths 3F to 3I are selectively steered to TDD paths 4I, 4K, and 4M and their respective transmitters by the multiplexer 160B for time division duplex (TDD) communication. For example, receive only path 4A and its receiver, FDD receive path 4C and its receiver, and TDD receive path 4H and its receiver are selectively steered by multiplexer 150C to one of the receive paths 2A, 2B, 2C, 2E, or 2G in the multichannel RF SDR ASIC section 122. Each of the amplifiers may have its characteristics selectively adjusted by the hardware abstraction layer 0 and the protocol level hardware control 1 of the cognitive platform control stack 300 in the multiradio baseband processing section 120.

Figure 1F:
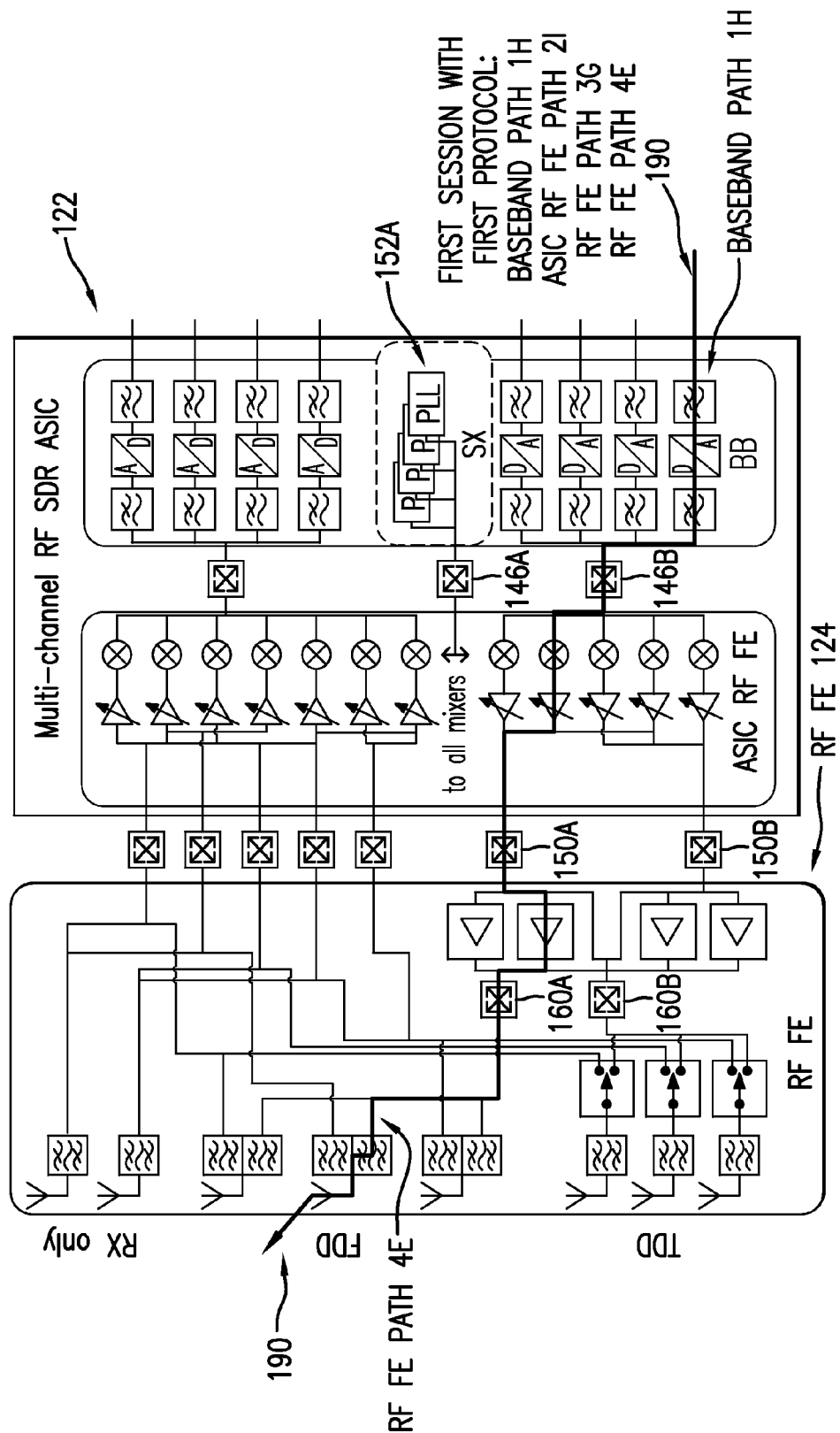
FIG. 1F illustrates an example circuit diagram of the multichannel RF SDR ASIC section 122 and the RF front-end section 124 implementing the path 190 of multiradio components for a first FDD session with a first protocol, through the Baseband Path 1H, the ASIC RF Front-End Path 2I, RF Front-End Path 3G, and RF Front-End Path 4E.

FIG. 1F illustrates an example circuit diagram of the multichannel RF SDR ASIC section 122 and the RF front-end section 124 implementing the path 190 of multiradio components for a first FDD session with a first protocol, through the Baseband Path 1H, the ASIC RF Front-End Path 2I, RF Front-End Path 3G, and an FDD transceiver in the RF Front-End Path 4E. Each of the paths is controlled by the cognitive hardware engine 6, resource allocator layer 3, performance adjustment layer 2, protocol level hardware control layer 1 and hardware abstraction layer 0 of the cognitive platform control stack 300 in the multiradio baseband processing section 120.

Figure 1G:
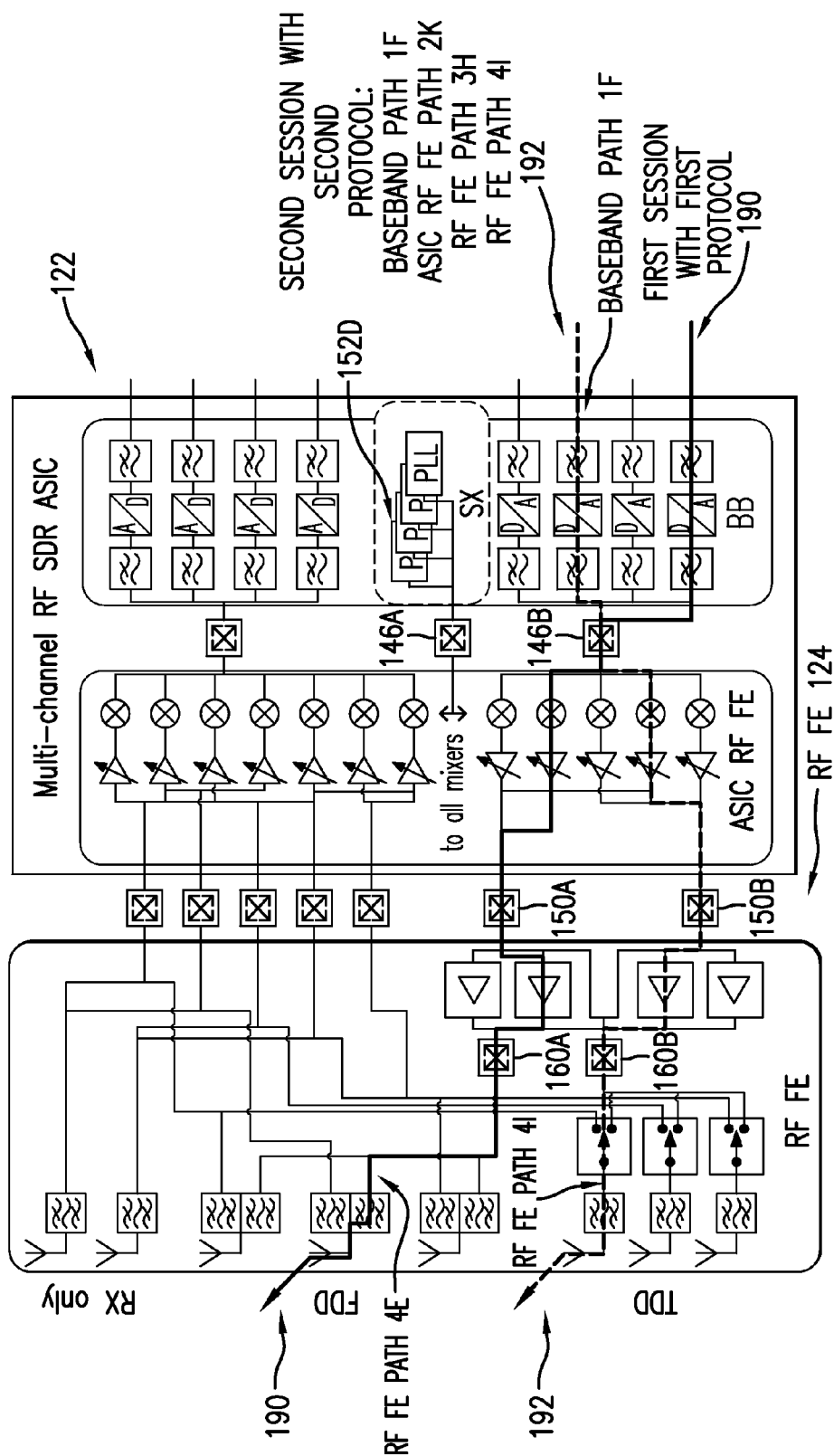
FIG. 1G illustrates an example circuit diagram of the multichannel RF SDR ASIC section 122 and the RF front-end section 124 implementing two concurrent paths, the path 190 for the first session of FIG. 1F and the second path 192 of multiradio components for a second TDD session with a second protocol, through the Baseband Path 1F, the ASIC RF Front-End Path 2K, RF Front-End Path 3H. and RF Front-End Path 4I.

FIG. 1G illustrates an example circuit diagram of the multichannel RF SDR ASIC section 122 and the RF front-end section 124 implementing two concurrent paths, the path 190 for the first FDD session of FIG. 1F and the second path 192 of multiradio components for a second TDD session with a second protocol, through the Baseband Path 1F, the ASIC RF Front-End Path 2K, RF Front-End Path 3H, and a TDD transceiver in the RF Front-End Path 4I. Each of the paths is controlled by the cognitive hardware engine 6, resource allocator layer 3, performance adjustment layer 2, protocol level hardware control layer 1 and hardware abstraction layer 0 of the cognitive platform control stack 300 in the multiradio baseband processing section 120.

FIG. 1H illustrates an example functional block diagram of the selective connections between the phase locked loops (PLL) 152A-152D and the mixers 141A-141G and 144H-144L through the multiplexer 146A of the multichannel RF SDR ASIC 122 of FIG. 1D. The multiplexer 146A and each of the phase locked loops (PLL) 152A-152D has its characteristics controlled by the hardware abstraction layer 0 and the protocol level hardware control 1 of the cognitive platform control stack 300 in the multiradio baseband processing section 120.

Figure 2A:
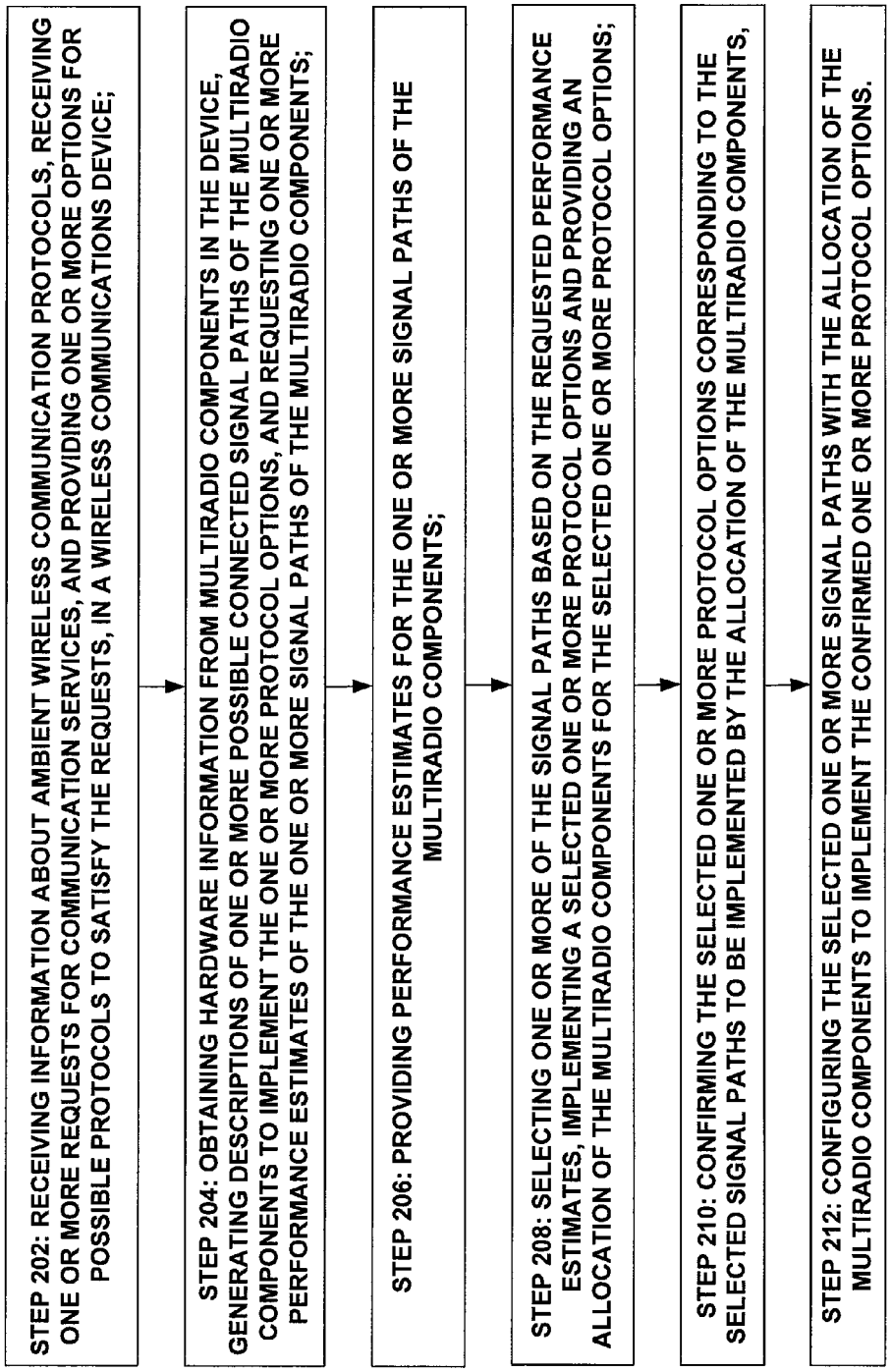
FIG. 2A illustrates an example flowchart 200 of an embodiment, depicting an example procedure carried out by the wireless device 100, including steps performed by the hardware manager the cognitive hardware engine the resource performance estimator and the resource allocator in establishing an allocation of multiradio components for a selected protocol.

FIG. 2A illustrates a flow diagram 200 of an example embodiment of the process in an example wireless device 100. The steps of the flow diagram represent computer code instructions stored in the memory 126 and 128 of the wireless device 100, which when executed by the central processing units 121, carry out the functions of the example embodiments of the invention. The steps may be carried out in another order than shown and individual steps may be combined or separated into component steps. The steps of the example method 200 are as follows.

Step 202: receiving information about ambient wireless communication protocols, receiving one or more requests for communication services, and providing one or more options for possible communication protocols to satisfy the requests, in a wireless communications device;

Step 204: obtaining hardware information from multiradio components in the device, generating descriptions of one or more possible connected signal paths of the multiradio components to implement the one or more protocol options, and requesting one or more performance estimates of the one or more signal paths of the multiradio components;

Step 206: providing performance estimates for the one or more signal paths of the multiradio components;

Step 208: selecting one or more of the signal paths based on the requested performance estimates, implementing a selected one or more protocol options and providing an allocation of the multiradio components for the selected one or more protocol options;

Step 210: confirming the selected one or more protocol options corresponding to the selected one or more signal paths to be implemented by the allocation of the multiradio components, and Step 212: configuring the selected one or more signal paths with the allocation of the multiradio components to implement the confirmed one or more protocol options.

Figure 2B:
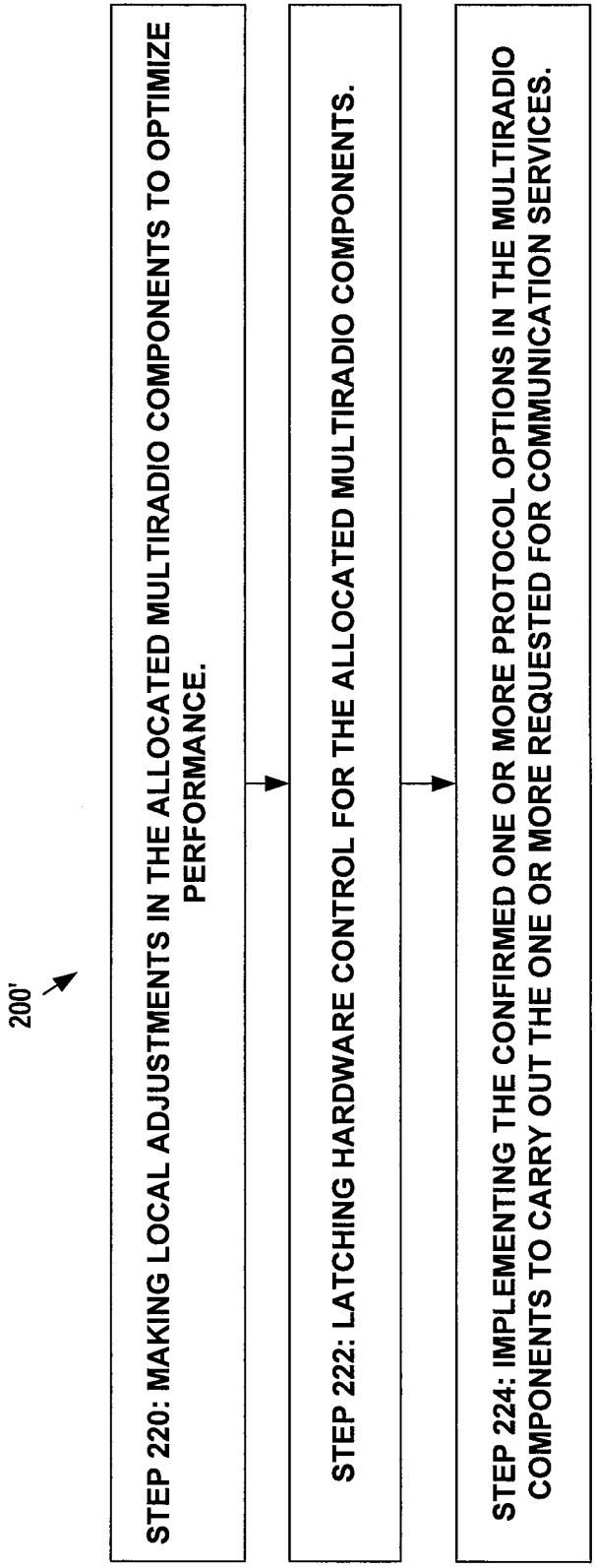
FIG. 2B illustrates an example flowchart 200' that continues the flow chart 200 of FIG. 2A, depicting an example the procedure carried out by the wireless device 100, including steps performed by the performance adjuster and the protocol level hardware control in implementing the selected protocol with the allocated multiradio components.

FIG. 2B illustrates a flow diagram 200' of an example embodiment of the process in an example wireless device 100, which continues the process of FIG. 2A. The steps of the flow diagram represent computer code instructions stored in the memory 126 and 128 of the wireless device 100, which when executed by the central processing units 121, carry out the functions of the example embodiments of the invention. The steps may be carried out in another order than shown and individual steps may be combined or separated into component steps. The steps of the method 200' are as follows.

Step 220: making local adjustments in the allocated multiradio components to optimize performance.

Step 222: latching hardware control for the allocated multiradio components.

Step 224: implementing the confirmed one or more protocol options in the multiradio components to carry out the one or more requested for communication services.

FIG. 2C illustrates a flow diagram 200" of an example embodiment of the process in an example wireless device 100, which continues the process of FIG. 2B. The steps of the flow diagram represent computer code instructions stored in the memory 126 and 128 of the wireless device 100, which when executed by the central processing units 121, carry out the functions of the example embodiments of the invention. The steps may be carried out in another order than shown and individual steps may be combined or separated into component steps. The steps of the method 200" are as follows.

Step 240: receiving a plurality of requests for communication services and provide a plurality of options for possible communication protocols to satisfy the plurality of requests;

Step 242: determining whether the plurality of the protocol options can run concurrently;

Step 244: if two or more of the plurality of protocol options cannot run concurrently, then inform the hardware manager for a determination whether to skip at least one of the plurality of protocol options;

Step 246: latching hardware control for a plurality of allocations of multiradio components connected over a plurality of respective signal paths for a subplurality of the plurality of protocol options that can run concurrently; and Step 248: implementing the subplurality of the plurality of protocol options in the multiradio components to carry out the plurality of requests for communication services.

Figure 3A:
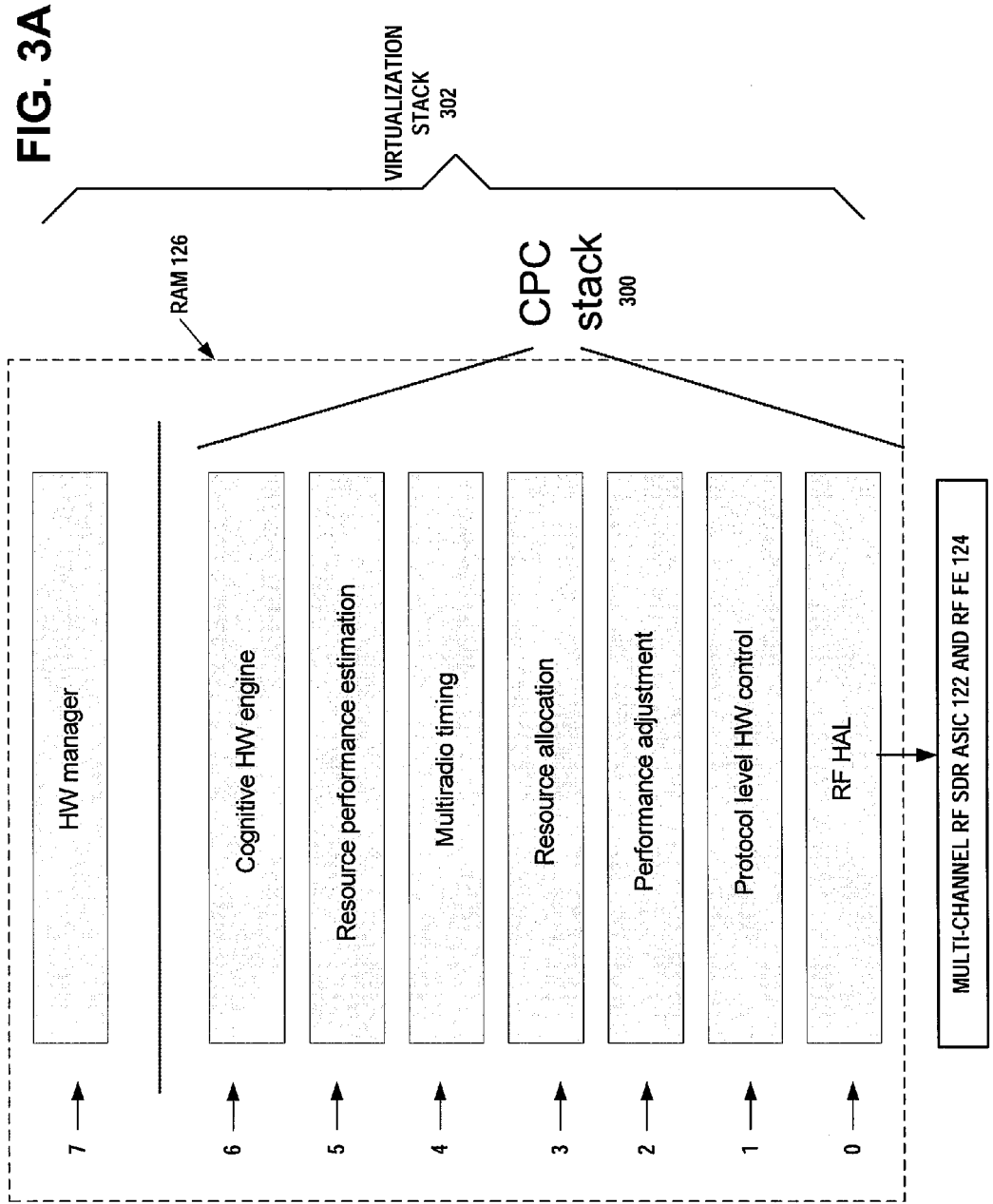
FIG. 3A illustrates an example Cognitive Platform Control (CPC) stack and the hardware manager embodied in program code in the memory of the wireless device 100, which is an abstraction layer model for RF virtualization.
Figure 3B:
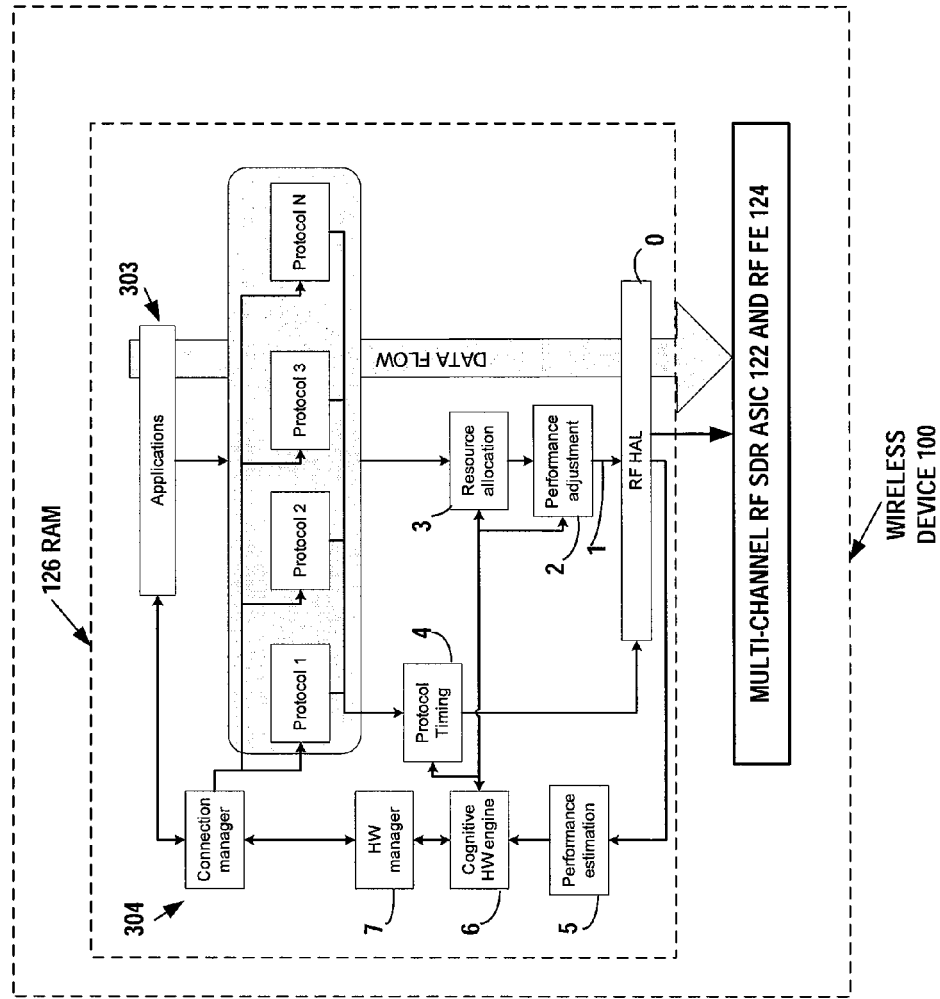
FIG. 3B illustrates an example multiradio RF platform control method, illustrating the functional relationships between the layers of the Cognitive Platform Control (CPC) stack of FIG. 3A.

FIGS. 3A and 3B illustrate the example cognitive platform control (CPC) stack 300 and the hardware manager 7 in the memory, RAM 126 and/or ROM 128 in the multiradio baseband processing section 120. The CPC 300 and hardware manager 7 is an abstraction layer model for RF virtualization. The virtualization stack 302 is divided into eight layers, each having a well-defined role. The topmost layer is the hardware manager 7 that manages the lower layers 6 to 0 of the cognitive platform control 300 part of the virtualization stack 302. The virtualization stack layers 302 are the hardware manager 7, the cognitive hardware engine 6, the resource performance estimation layer 5, the multiradio timing 4, the resource allocation 3, the performance adjustment 2, the protocol level hardware control 1, and the RF Hardware Abstraction Layer (HAL) 0. The hardware abstraction layer (HAL) 0 is implemented in program code between the physical multiradio hardware components and the protocol level hardware control 1 program code. The function of the hardware abstraction layer 0 is to hide details in hardware from the protocol level hardware control 1, so that the upper layers of the CPC 300 do not need to be changed to run different multiradio hardware components. Details of the hardware abstraction layer (HAL) 0 can be found, for example, in the patent publication WO 2009/109687 assigned to Nokia Corporation and incorporated herein by reference.

Figure 3C:
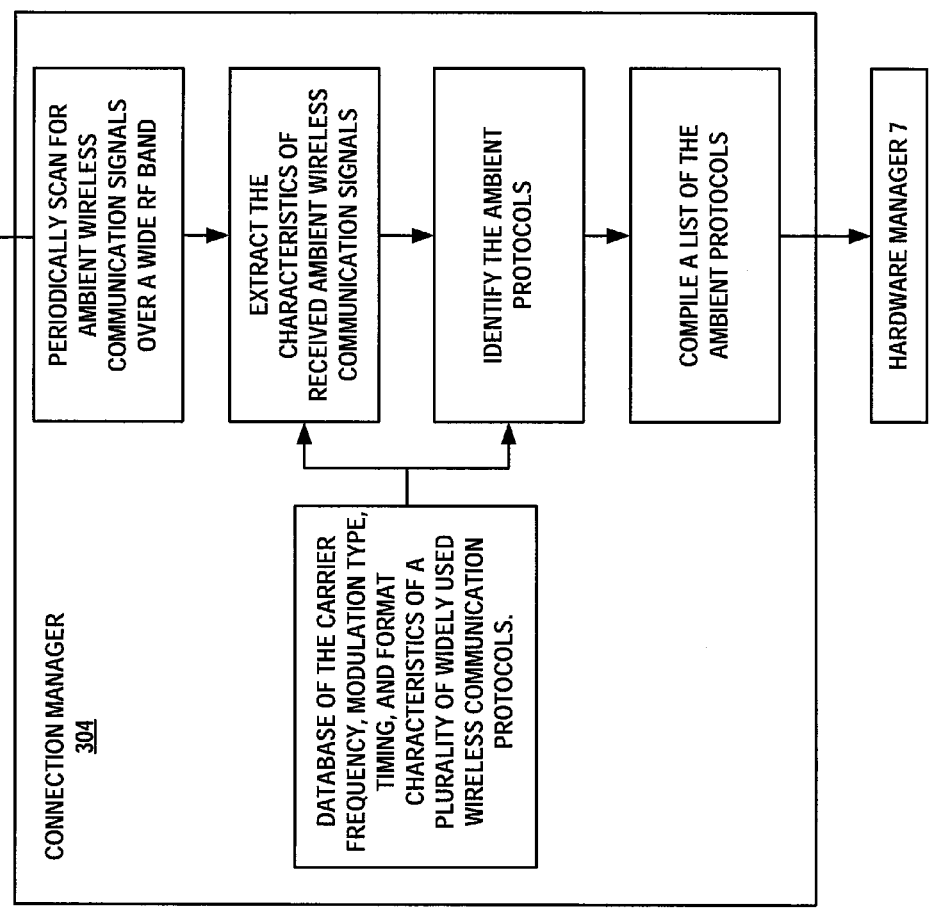
FIG. 3C illustrates an example functional block diagram of the connection manager 304.

FIG. 3B illustrates an example multiradio RF platform control method stored in the memory, RAM 126 and/or ROM 128, illustrating the functional relationships between the layers of the cognitive platform control (CPC) stack 300 of FIG. 3A. The hardware manager 7 in the RAM 126 and/or ROM 128 of the wireless communications device is configured to receive information about ambient wireless communication protocols from the connection manager 304 and receive from applications 303 a request for communication services and to provide options for possible communication protocols to satisfy the request. The connection manager 304, an example functional block diagram of which is shown in FIG. 3C, continuously or periodically scans for ambient wireless communication signals over a wide RF band, e.g., an available spectrum from 1900 to 4000 MHz. The connection manager 304 includes a database of the carrier frequency, modulation type, timing, and format characteristics of a plurality of widely used wireless communication protocols. The connection manager 304 extracts the characteristics of received ambient wireless communication signals, identifies the ambient protocols, and compiles a list of the ambient protocols that it updates as the wireless device 100 moves from one location to another.

Figure 3D:
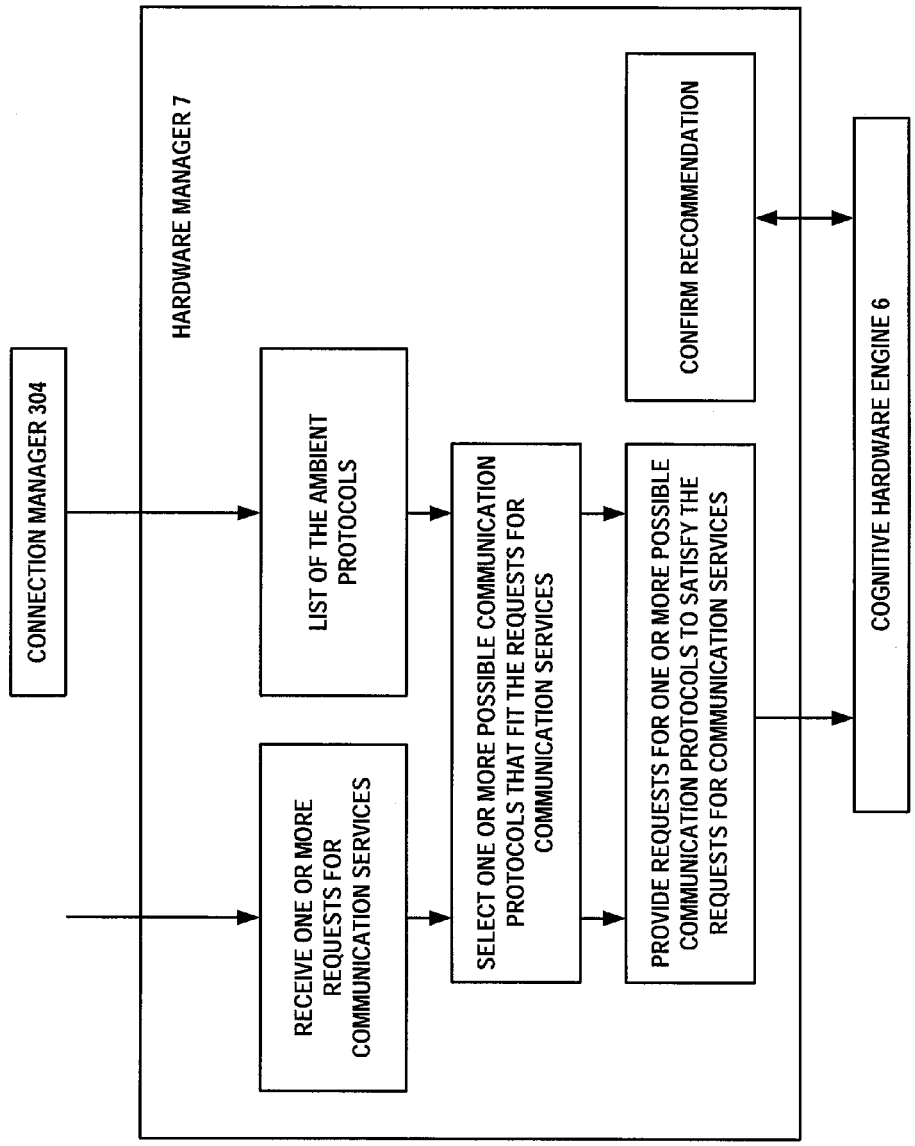
FIG. 3D illustrates an example functional block diagram of the hardware manager 7.

FIG. 3D illustrates an example functional block diagram of the hardware manager 7. The hardware manager 7 receives one or more requests for communication services, which may be received from another wireless device or may originate in an application running on the device 100. The hardware manager 7 receives the list of the ambient protocols from the connection manager 304. The hardware manager 7 select one or more possible communication protocols that fit the requests for communication services. The hardware manager 7 provides requests for one or more possible communication protocols to the cognitive hardware engine 6, to satisfy the requests for communication services. Later, the hardware manager 7 receives from the cognitive hardware engine 6 a recommendation for one or more of the protocols, which the hardware manager 7 confirms.

FIG. 3E illustrates an example functional block diagram of the cognitive hardware engine 6. The cognitive hardware engine 6 searches for one or more possible hardware configurations to satisfy the requests, in a database of hardware configuration path models of generic configurable and dedicated components for a variety of protocols. The cognitive hardware engine 6 receives hardware information from multiradio components in the device. The cognitive hardware engine 6 generates descriptions of one or more possible connected signal paths of the multiradio components to implement the one or more possible protocol options. The descriptions are output to the resource performance estimator 5. The cognitive hardware engine 6 receives a report of the lowest cost solutions from the resource allocator 3, which it forwards as a recommendation of one or more protocols to the hardware manager 7.

The cognitive hardware engine 6 in the RAM 126 and/or ROM 128 of the wireless communications device is configured to obtain hardware information from multiradio components in the multi-channel RF SDR ASIC 122 and RF front-end 124 of the device and to receive from the hardware manager 7, the application request and the options for possible protocols concerning the request. The cognitive hardware engine 6 is further configured to generate descriptions of one or more possible connected signal paths of the multiradio components to implement the one or more suggested possible protocols and request one or more performance estimates of the one or more possible connected signal paths of the multiradio components.

The cognitive hardware engine 6 consists of two sublayers, upper layer and lower layer. The functionality of the upper layer is to function as a recommendation engine for hardware manager 7. The cognitive hardware engine 6 possesses information on possible spectrum allocations and a database of generic paths of generic components for a variety of protocols. The functionality of the lower layer is as a hardware configuration engine that knows all possible configurations and their key properties (RF band, baseband bandwidth, dynamic range, baseband capacity) of the multiradio components in the multi-channel RF SDR ASIC 122 and RF front-end 124. The recommendation is based on the processes performed by the resource performance estimation layer 5, the multiradio timing 4, the resource allocation 3. The task that cognitive hardware engine 6 performs is, for example "Ask resource allocation layer 3 to provide resources for tasks". In addition, cognitive hardware engine 6 communicates with the hardware abstraction layer 0 to get information on what kind of multiradio components are in the multichannel RF SDR ASIC 122 and RF front-end 124. The hardware abstraction layer 0 abstracts the RF information from the application. This layer has precise information on the configuration possibilities, configuration times, power consumption estimates, performance (NF, DR, Gain, Band, Bandwidth) and maps the functions to hardware registers.

The resource performance estimator 5 in the RAM 126 and/or ROM 128 of the wireless communications device is configured to receive the requests for performance estimates from the cognitive hardware engine 6 and to provide performance estimates for the possible connected signal paths of the multiradio components in the multi-channel RF SDR ASIC 122 and RF front-end 124 to implement the suggested possible protocols. The resource performance estimator 5 functions as general performance analyzer and estimator to monitor events, for example missed commands, and it estimates resource usage. The resource performance estimator 5 conveys the collected information to cognitive hardware engine 6 for further handling.

Figure 3F:
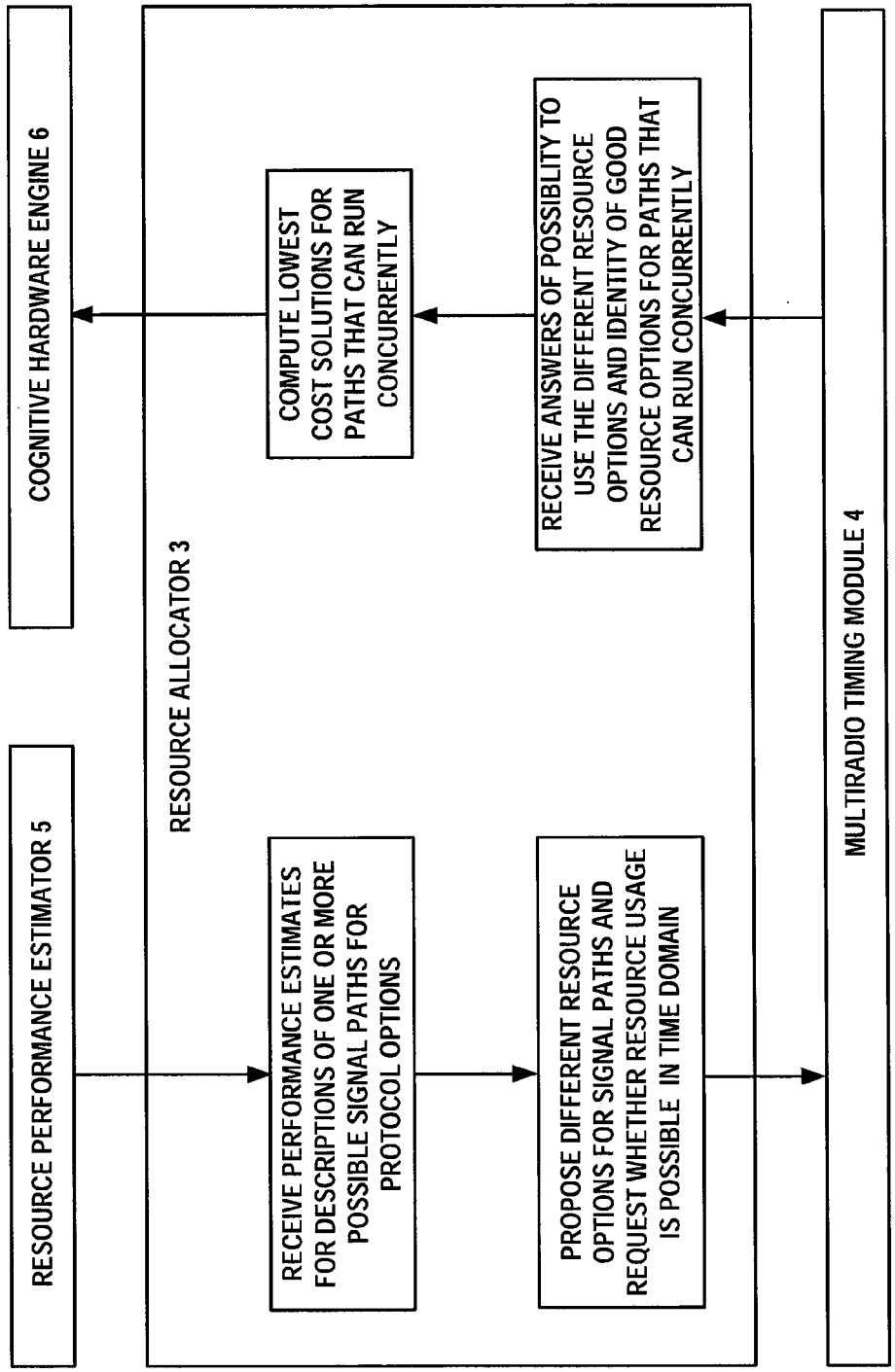
FIG. 3F illustrates an example functional block diagram of the resource allocator 3.

FIG. 3F illustrates an example functional block diagram of the resource allocator 3. The resource allocator 3 in the RAM 126 and/or ROM 128 of the of the wireless communications device is configured to receive from the resource performance estimator 5, the performance estimates for possible connected signal paths of the multiradio components. The resource allocator 3 proposes to the multiradio timing module 4 different resource options for signal paths and requests whether resource usage is possible in the time domain. The multiradio timing module 4 provides answers to these proposals until proposed resource usages are found that are available and enable concurrent operation of the signal paths that they form. The multiradio timing module 4 indicates the identity of good resource options for paths that can run concurrently. The resource allocator 3 provides to the cognitive hardware engine 6 an allocation of the multiradio components for a selected one or more signal paths in the multi-channel RF SDR ASIC 122 and RF front-end 124 for selected one or more of the protocol options. The resource allocator 3 dynamically configures the resource allocation for each protocol option, preferably using lowest cost path for the tasks, based on algorithms and data from the memory. The lowest cost path algorithms use various parameters, for example prioritization list, time, and power consumption, as basis for their decisions.

The hardware manager 7 is further configured to receive from the cognitive hardware engine, information on the selected one or more of the protocol options and further configured to approve configuring the selected one or more of the possible connected signal paths in the multiradio components to implement the selected one or more of the protocol options on the multiradio components in the multi-channel RF SDR ASIC 122 and RF front-end 124. The hardware manager 7 is configured to confirm to the cognitive hardware engine 6, the allocation of the multiradio components 122 and 124 for the selected protocol. When the one or more selected protocol options have been confirmed by the hardware manager 7, the hardware manager 7 passes the identity of the one or more selected protocol options to the connection manager 304. The connection manager 304 enables the selected protocol stacks (protocol_1, protocol_2, protocol_3, and/or protocol_4 of FIG. 3B) to begin sending and receiving packets through the configured, selected signal paths in the multiradio components.

The cognitive hardware engine 6 is further configured to grant permission for the allocation of the multiradio components 122 and 124 for the selected protocol options.

The resource allocator 3 is further configured to receive from the cognitive hardware engine 6 the grant of permission the allocation of the multiradio components 122 and 124 for the selected protocol options and to generate a command to use the allocation of the multiradio components 122 and 124.

A performance adjuster 2 in the wireless communications device is configured to receive the command from the resource allocator 3 and to make local adjustments in the allocated multiradio components 122 and 124 to optimize performance.

The performance adjuster 2 performs local adjustments in the reserved resources/paths in order to optimize the performance, for example to minimize power consumption by re-partitioning gains of the components in the paths.

A protocol level hardware control 1 in the wireless communications device is configured to receive the command from the resource allocator 3 and to latch hardware control based on the commands for the allocated multiradio components 122 and 124. The protocol level hardware control 1 latches the hardware control based on protocol commands for the allocated resource.

The allocated multiradio components 122 and 124 are configured to receive the latched hardware control and to implement the selected protocol options to carry out the requested for communication services. Software configurable radio frequency components are described, for example, in the copending published patent application US 2008/0293445 assigned to Nokia Corporation and incorporated herein by reference.

The hardware manager 7 is further configured to receive from applications 303 a plurality of requests for communication services and to provide options for possible communication protocols to satisfy the plurality of requests.

Figure 3G:
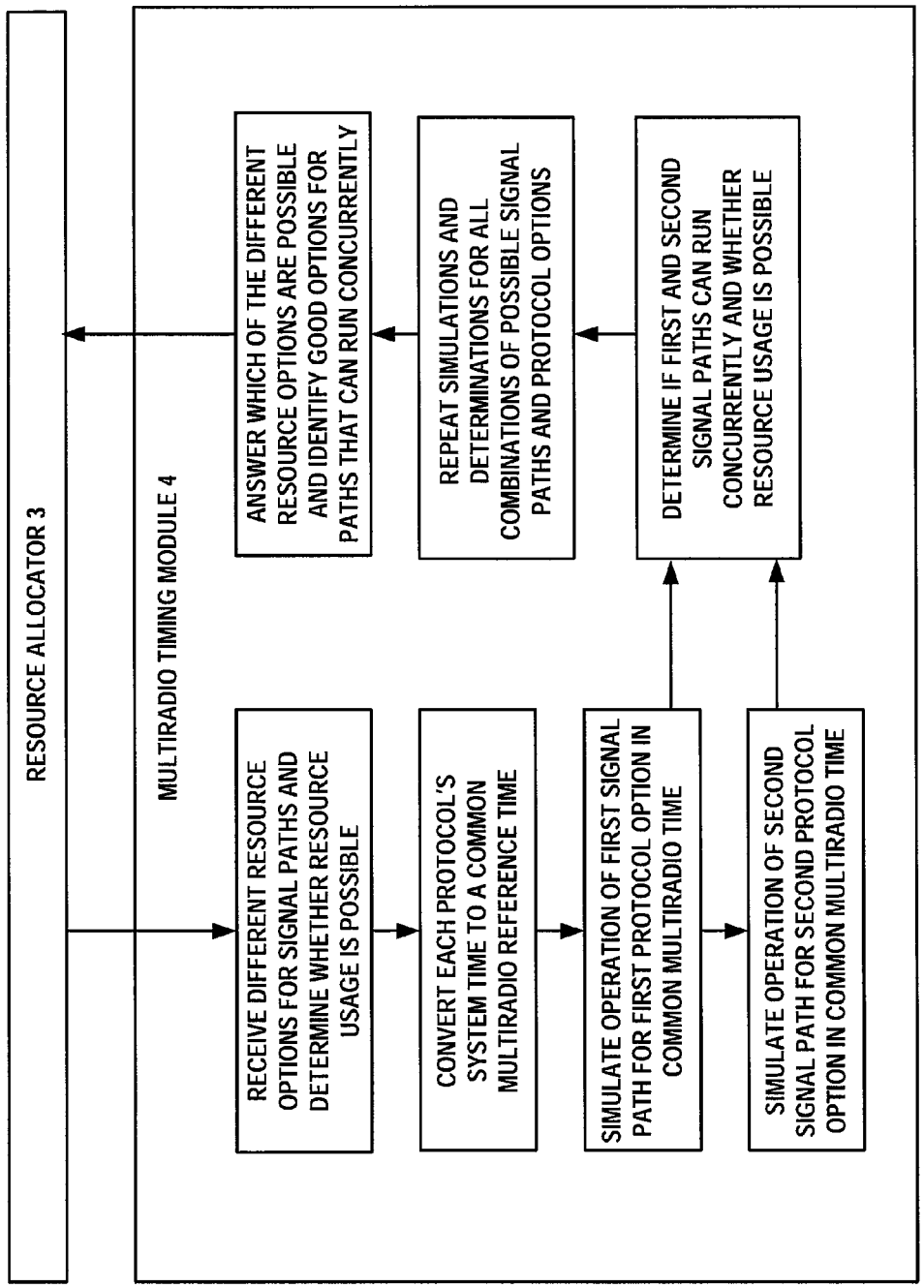
FIG. 3G illustrates an example functional block diagram of the multiradio timing module 4.

FIG. 3G illustrates an example functional block diagram of the multiradio timing module 4. A multiradio timing module 4 in the wireless communications device is configured to receive from the resource allocator 3 different resource options for signal paths and receive a request to determine whether resource usage is possible for the possible signal paths for protocol options that can be implemented by a plurality of allocations of the multiradio components 122 and 124 to satisfy the plurality of respective requests. The multiradio timing module 4 determines whether the plurality of selected protocol options can run concurrently and whether resource usage is possible and it provides the resulting determination to the resource allocator 3. The multiradio timing module 4 determines the timing characteristics of each of the plurality of selected protocol options from timing allocation tables in the respective MAC layers of the protocols, as described in the copending published patent application US 2008/0002623 assigned to Nokia Corporation and incorporated herein by reference. The multiradio timing module 4 converts each protocol's system time to a common multiradio reference time, as described in the copending published patent application US 2008/0004070 assigned to Nokia Corporation and incorporated herein by reference. The multiradio timing module 4 performs a conventional RF circuit simulation of the operation of each of the signal paths in carrying out the respective protocol options, based on the common multiradio reference time. The multiradio timing module 4 simulates the operation of a first signal path for a first protocol option in common multiradio reference time, simulates the operation of a second signal path for a second protocol option in common multiradio reference time, and determines if the first and second signal paths can run concurrently. The multiradio timing module 4 repeats simulations and determinations in this manner for all combinations of the possible signal paths and the protocol options and identifies those possible signal paths that can run concurrently for the protocol options. The multiradio timing module 4 dynamically keeps track of the possible time scale allocations on a protocol level and provides the information as to whether certain protocols can run concurrently in the same platform. The multiradio timing module 4 then reports to the resource allocator 3 the identities of the possible signal paths that can run concurrently for protocol options. If two or more of the plurality of protocol options cannot run concurrently, then the multiradio timing module 4 requests the hardware manager 7 to determine whether to skip at least one of the plurality of protocol options.

The protocol level hardware control 1 is further configured to receive commands from the resource allocator 3 and to latch hardware control based on the commands for the plurality of allocations of multiradio components 122 and 124 connected over the plurality of respective signal paths for the plurality of respective selected protocols.

The allocated multiradio components 122 and 124 are further configured to receive the latched hardware control and to implement the plurality of respective selected protocols to carry out the plurality of respective requests for communication services.

Figure 4:
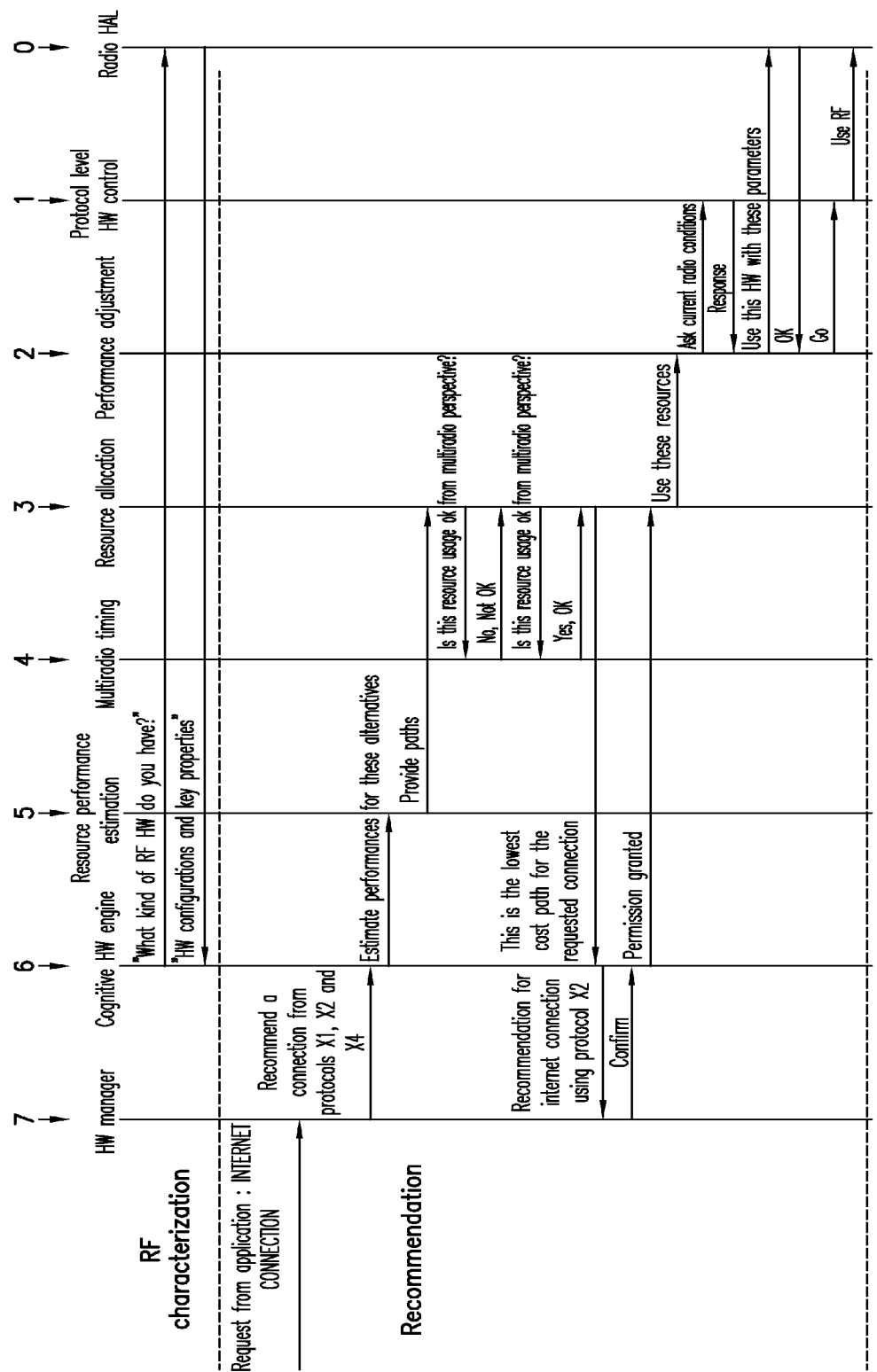
FIG. 4 illustrates an example process flow diagram processing an example communications request using the multiradio RF platform control method of FIG. 3B.

FIG. 4 illustrates an example process flow diagram processing an example communications request using the multiradio RF platform control method of FIG. 3B. Initially, the hardware manager layer 7 in the wireless device 100 obtains information about ambient wireless communication protocols. Also, the cognitive hardware engine layer 6 gathers the hardware configurations and key properties in the wireless device 100 from the RF Hardware Abstraction Layer 0.

Then an example communications request is received by the hardware manager layer 7 in the wireless device 100 for an Internet connection. In response, the hardware manager layer 7 provides a recommendation of protocols X1, X2, and X4 to the cognitive hardware engine layer 6. The cognitive hardware engine layer 6 generates descriptions of one or more possible connected signal paths of the multiradio components to implement the one or more suggested possible protocols and requests one or more performance estimates of the one or more possible connected signal paths of the multiradio components from the resource performance estimation layer 5. The resource performance estimation layer 5 provides to the resource allocation layer 3, performance estimates for the possible connected signal paths of the multiradio components to implement the suggested possible protocols. The resource allocation layer 3 then asks the multiradio timing layer 4 if any of the possible connected signal paths can run concurrently with other existing signal paths. One or more signal paths are selected by the resource allocation layer 3 corresponding to one or more selected protocols and identified to the cognitive hardware engine layer 6. The cognitive hardware engine layer 6 then reports the recommendation of the selected signal paths for the identified protocols to the hardware manager layer 7.

The hardware manager layer 7 then confirms the selected signal paths for the identified protocols to the cognitive hardware engine layer 6. The cognitive hardware engine layer 6 grants permission for the selected signal paths for the identified protocols to the resource allocation layer 3. The resource allocation layer 3 commands the performance adjustment layer 2 to use the multiradio components to implement the selected signal paths for the identified protocols. The performance adjustment layer 2 obtains the current radio conditions from the protocol level hardware control layer 1. The performance adjustment layer 2 then instructs the RF Hardware Abstraction Layer 0 to use the multiradio components to implement the selected signal paths with specified values for the parameters of the components to accommodate the current radio conditions. The RF Hardware Abstraction Layer 0 then controls the multiradio components in the multi-channel RF SDR ASIC 122 and RF front-end 124 to form the selected signal paths for the identified protocols.

The granularity of the request by an application can vary. For example, the request may be "use WLAN access point having SSID XXX for the IP connection YYY" instead of using "use best connectivity to access service ZZZ in the internet".

The resulting embodiments to enable dynamic configuration of multiradio RF platforms to support multiple concurrent data flows.

The RAM 126 and ROM 128 of FIG. 1C may be removable memory devices such as smart cards, Subscriber Identity Modules (SIMs), Wireless Application Protocol Identity Modules (WIMs), semiconductor memories such as a RAM, ROM, or PROM, flash memory devices, etc. The program instructions implementing the flow diagrams 200, 200', and 200" of FIGS. 2A, 2B, and 2C, respectively, may be embodied as program logic stored in the RAM 126 and/or ROM 128 in the form of sequences of programmed instructions which may be executed in the one or more CPUs 121, to carry out the functions of the disclosed embodiments. The program logic may be delivered to the writeable RAM, ROM, PROM, flash memory device, etc. 126 of the apparatus from a computer program product or article of manufacture in the form of computer-usable media such as resident memory devices, smart cards or other removable memory devices. Alternately, the program instructions implementing the flow diagrams 200, 200', and 200" of FIGS. 2A, 2B, and 2C, respectively, may be embodied as integrated circuit logic in the form of programmed logic arrays or custom designed application specific integrated circuits (ASIC).

The wireless device 100 may be a mobile communications device, PDA, cell phone, laptop or palmtop computer, FM receiver, DVB-H receiver, GPS receiver, Emergency Position Indicating Radiobeacon (EPIRB), wireless headset, or the like. The wireless device 100 may also be an integrated component of a vehicle, such as an automobile, bicycle, airplane, water craft, ship, or other mobile conveyance. The wireless device 100 may typically be mobile and powered by a battery included in the device. The wireless device 100 may also be a stationary device, such as a wireless access point or base station.

The following Table summarizes the layers of the visualization stack 302, providing a brief description, time concept, and example functions for each layer.

| Layer | Name | Description | Time concept | Example |
| --- | --- | --- | --- | --- |
| 7 | HW manager | Receives and replies to application requests. Converts requests into suitable format for lower layers. Does actual transport selection based on recommendation from cognitive HW engine and communicates the decision to cognitive HW engine. This is the layer that application communicates with. This layer hides CPC stack from the application. In this context the application can be individual protocol or connection manager (like mobility policy manager in SDR FA). | APE-time | Request from the application "Internet connection" Communication with cognitive HW engine "Give a recommendation for an internet connection". Recommendation from cognitive HW engine: "WLAN" Selects WLAN as transport and communicates it to cognitive HW engine |
| 6 | Cognitive HW engine | Gives recommendation on the connection to HW manager, based on process done by layers 3, 4, and 5. Communicates with RF HAL to get info on possible RF configurations and their key parameters. Ask resources from resource allocation. | Internal control time | Communication with HW manager: "Recommendation for connection is WLAN". Communication with RF HAL: "What kind of HW do you have?" Communication with resource allocation: "Estimate performances of these alternatives", "Permission granted to use proposed resources" |
| 5 | Resource performance estimation | Monitoring of events during radio usage. Communication of connection quality to cognitive HW engine | Internal control time | Communication with cognitive HW engine: "Connection quality is 99.5%" |
| 4 | Multiradio timing | Provides dynamically info on possible time scale resource allocations | Normal radio time | Communication with resource allocation: "Resource usage is possible" |
| 3 | Resource allocation | Estimates the performance of possible chain configurations and protocols based on information from cognitive HW engine and allocates the lowest cost path(s). Communicates with multiradio timing on time-scale allocation possibilities. Communicates lowest cost solution to cognitive HW engine. Communicates selected resources to performance adjustment | Internal control time | Communication with multiradio timing: "Is this resource usage possible from multiradio perspective?" Communication with cognitive HW engine: "These are the lowest cost resources that can be allocated". Communication with performance adjustment: "Use these resources" |
| 2 | Performance adjustment layer | Performs chain-internal performance optimization, like static calibrations or dynamic performance tunings. In the latter case the function communicates with layer 1 dynamic performance requests from protocols. | Internal control time | Add 1 db gain to D/A and drop 1 db gain from PA to minimize power consumption |
| 1 | Protocol level HW control | Provides the protocol-dependent control data to the lowest layer | Real-time | Slot 1 P = 20 dBm slot 4 P = 17 dBm . . . |
| 0 | RF HAL | Abstraction of RF HW | Internal control time | Communication with cognitive HW engine: "I have 4 TX pipes and 6 RX pipes that can be switched according to this matrix, properties for pipe 1 are RF band 1.9 . . . 2.2 Ghz . . . " |

Using the description provided herein, the embodiments may be implemented as a machine, process, or article of manufacture by using standard programming and/or engineering techniques to produce programming software, firmware, hardware or any combination thereof.

Any resulting program, having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that is stored permanently or temporarily on any computer-usable medium.

Although specific example embodiments have been disclosed, a person skilled in the art will understand that changes can be made to the specific example embodiments without departing from the spirit and scope of the invention.

What is claimed is:

1. An apparatus, comprising:
at least one radio transmitter and/or receiver;
at least one processor;
at least one memory including computer program code;
the at least one memory and the computer program code configured to, with the at least one processor, cause the apparatus at least to:
receive information about ambient wireless communication protocols, receive a plurality of requests for communication services, and provide a plurality of options for possible communication protocols to satisfy the requests, in a wireless communications device;
obtain hardware availability information of sharable multiradio components in the wireless communications device, the hardware availability information further comprising one or more radio frequency transmission or reception parameters of the sharable multiradio components in the wireless communications device;
generate descriptions of a plurality of possible connected signal paths of the sharable multiradio components in the wireless communications device to implement the plurality of protocol options, and request a plurality of performance estimates of the plurality of signal paths of the sharable multiradio components;
provide performance estimates for the plurality of signal paths of the sharable multiradio components;
select a plurality of the signal paths based on the requested performance estimates, implementing a selected plurality of protocol options and provide allocation of the sharable multiradio components for the selected plurality of protocol options;
confirm the selected plurality of protocol options corresponding to the selected plurality of signal paths to be implemented by the allocation of the sharable multiradio components,
make local adjustments in the allocated sharable multiradio component to optimize performance;
determine whether the selected plurality of the protocol options can run concurrently;
if two or more of the selected plurality of protocol options cannot run concurrently, then select a subplurality of the selected plurality of protocol options, which can run concurrently;
latch hardware control for a plurality of multiradio components connected over a plurality of respective signal paths for the subplurality of the selected plurality of protocol options that can run concurrently;
implement the subplurality of the selected plurality of protocol options in the multiradio components to carry out the plurality of requests for communication services; and
configure the selected one or more signal paths in the wireless communications device with the allocation of the sharable multiradio components to implement the confirmed one or more protocol options.

2. The apparatus of claim 1, further comprising:
the at least one memory including computer program code to implement a hardware manager, a cognitive hardware engine, a resource performance estimator, and a resource allocator embodied as a virtualization stack.

3. The apparatus of claim 1, further comprising:
the at least one memory including computer program code to implement a hardware manager, cognitive hardware engine, resource performance estimator, sharable multiradio timing module, resource allocator, performance adjuster, protocol level hardware control, and a hardware abstraction layer embodied as a virtualization stack.

4. The apparatus of claim 3, further comprising:
the hardware abstraction layer being implemented in program code between the sharable multiradio hardware components and the virtualization stack to hide details in hardware from the virtualization stack, so that upper layers of the virtualization stack do not need to be changed to run different sharable multiradio hardware components.

5. The apparatus of claim 1, wherein the sharable multiradio components include at least one generic configurable component through which a plurality of the protocol options are implementable, the obtained hardware information including an identity or configuration information of the generic component.

6. A method, comprising the steps of:
receiving information about ambient wireless communication protocols, receiving a plurality of requests for communication services, and providing a plurality of options for possible communication protocols to satisfy the requests, in a wireless communications device;
obtaining hardware availability information of sharable multiradio components in the wireless communications device, the hardware availability information further comprising a plurality of radio frequency transmission or reception parameters of the sharable multiradio components in the wireless communications device;
generating descriptions of a plurality of possible connected signal paths of the sharable multiradio components in the wireless communications device to implement the plurality of protocol options, and requesting a plurality of performance estimates of the plurality of signal paths of the sharable multiradio components;
providing performance estimates for the plurality of signal paths of the sharable multiradio components;
selecting a plurality of the signal paths based on the requested performance estimates, implementing a selected plurality of protocol options and providing an allocation of the sharable multiradio components for the selected plurality of protocol options;
confirming the selected plurality of protocol options corresponding to the selected plurality of signal paths to be implemented by the allocation of the sharable multiradio components,
making local adjustments in the allocated sharable multiradio component to optimize performance;
determining whether the selected plurality of the protocol options can run concurrently;
if two or more of the selected plurality of protocol options cannot run concurrently, then selecting a subplurality of the selected plurality of protocol options, which can run concurrently;
latching hardware control for a plurality of multiradio components connected over a plurality of respective signal paths for the subplurality of the selected plurality of protocol options that can run concurrently;
implementing the subplurality of the selected plurality of protocol options in the multiradio components to carry out the plurality of requests for communication services; and
configuring the selected plurality of signal paths in the wireless communications device with the allocation of the sharable multiradio components to implement the confirmed one or more protocol options.

7. A non-transitory computer readable medium storing program instructions, which when executed by a computer processor, perform the steps of:

receiving information about ambient wireless communication protocols, receiving a plurality of requests for communication services, and providing a plurality of options for possible communication protocols to satisfy the requests, in a wireless communications device;

obtaining hardware availability information of sharable multiradio components in the wireless communications device, the hardware availability information further comprising a plurality of radio frequency transmission or reception parameters of the sharable multiradio components in the wireless communications device;

generating descriptions of a plurality of possible connected signal paths of the sharable multiradio components in the wireless communications device to implement the plurality of protocol options, and requesting a plurality of performance estimates of the plurality of signal paths of the sharable multiradio components;

providing performance estimates for the plurality of signal paths of the sharable multiradio components;

selecting a plurality of the signal paths based on the requested performance estimates, implementing a selected plurality of protocol options and providing an allocation of the sharable multiradio components for the selected plurality of protocol options;

confirming the selected plurality of protocol options corresponding to the selected plurality of signal paths to be implemented by the allocation of the sharable multiradio components, making local adjustments in the allocated sharable multi-radio component to optimize performance;

determining whether the selected plurality of the protocol options can run concurrently;

if two or more of the selected plurality of protocol options cannot run concurrently, then selecting a subplurality of the selected plurality of protocol options, which can run concurrently;

latching hardware control for a plurality of multiradio components connected over a plurality of respective signal paths for the subplurality of the selected plurality of protocol options that can run concurrently;

implementing the subplurality of the selected plurality of protocol options in the multiradio components to carry out the plurality of requests for communication services; and configuring the selected plurality of signal paths in the wireless communications device with the allocation of the sharable multiradio components to implement the confirmed one or more protocol options.

8. An apparatus, comprising:

means for receiving information about ambient wireless communication protocols, receiving a plurality of requests for communication services, and providing a plurality of options for possible communication protocols to satisfy the requests, in a wireless communications device;

means for obtaining hardware availability information of sharable multiradio components in the wireless communications device, the hardware availability information further comprising a plurality of radio frequency transmission or reception parameters of the sharable multi-radio components in the wireless communications device;

means for generating descriptions of a plurality of possible connected signal paths of the sharable multiradio components in the wireless communications device to implement the plurality of protocol options, and requesting a plurality of performance estimates of the plurality of signal paths of the sharable multiradio components;

means for providing performance estimates for the plurality of signal paths of the sharable multiradio components;

means for selecting a plurality of the signal paths based on the requested performance estimates, implementing a selected plurality of protocol options and providing an allocation of the sharable multiradio components for the selected plurality of protocol options;

means for confirming the selected plurality of protocol options corresponding to the selected plurality of signal paths to be implemented by the allocation of the sharable multiradio components, means for making local adjustments in the allocated sharable multi-radio component to optimize performance;

means for determining whether the selected plurality of the protocol options can run concurrently;

means for if two or more of the selected plurality of protocol options cannot run concurrently, then selecting a subplurality of the selected plurality of protocol options, which can run concurrently;

means for latching hardware control for a plurality of multiradio components connected over a plurality of respective signal paths for the subplurality of the selected plurality of protocol options that can run concurrently;

means for implementing the subplurality of the selected plurality of protocol options in the multiradio components to carry out the plurality of requests for communication services; and means for configuring the selected plurality of signal paths in the wireless communications device with the allocation of the sharable multiradio components to implement the confirmed one or more protocol options.

9. An apparatus, comprising:

a hardware manager in a wireless communications device, configured to receive information about ambient wireless communication protocols and receive a plurality of requests for communication services, and further configured to provide a plurality of options for possible communication protocols to satisfy the requests;

a cognitive hardware engine in the wireless communications device, configured to obtain hardware availability information of sharable multiradio components in the wireless communications device, the hardware availability information further comprising a plurality of radio frequency transmission or reception parameters of the sharable multiradio components in the wireless communications device, the cognitive hardware engine further configured to receive from the hardware manager the plurality of protocol options concerning the plurality of requests, the cognitive hardware engine further configured to generate descriptions of a plurality of possible connected signal paths of the sharable multiradio components in the wireless communications device to implement the plurality of protocol options and request a plurality of performance estimates of the plurality of signal paths of the sharable multiradio components;

a resource performance estimator in the wireless communications device, configured to receive the request for a plurality of performance estimates from the cognitive hardware engine and to provide performance estimates for the plurality of signal paths of the sharable multiradio components;

a resource allocator in the wireless communications device, configured to receive the performance estimates for the plurality of signal paths of the sharable multiradio components and to select a plurality of the signal paths based on the requested performance estimates, the resource allocator further configured to provide to the cognitive hardware engine an allocation of the sharable multiradio components for the selected plurality of signal paths;

the cognitive hardware engine further configured to receive the allocation of the sharable multiradio components for the selected plurality of signal paths and further configured to identify to the hardware manager which of the plurality of protocol options corresponds to the selected plurality of signal paths;

the hardware manager further configured to confirm the plurality of protocol options identified by the cognitive hardware engine as corresponding to the selected plurality of signal paths to be implemented by the allocation of the sharable multiradio components;

a performance adjuster in the wireless communications device, configured to receive the command from the resource allocator and to make local adjustments in the allocated sharable multiradio components to optimize performance;

a sharable-multiradio timing module in the wireless communications device, configured to receive from the resource allocator a plurality of allocations of the sharable-multiradio components connected over a plurality of selected signal paths to satisfy the plurality of requests and to determine whether the plurality of selected signal paths can run concurrently and configured to provide the resulting determination to the resource allocator;

the protocol level hardware control further configured to receive commands from the resource allocator and to latch hardware control based on the commands for the plurality of allocations of sharable-multiradio components connected over the plurality of respective signal paths; and the allocated sharable-multiradio components further configured to receive the latched hardware control and to implement the plurality of selected signal paths to carry out the plurality of respective requests for communication services.

10. The apparatus of claim 9, further comprising:

the cognitive hardware engine, resource performance estimator, and resource allocator in the wireless communications device are embodied as a cognitive platform control stack and along with the hardware manager, are embodied in program code as a virtualization stack in a memory of the wireless device.

11. The apparatus of claim 9, further comprising:

the cognitive hardware engine, resource performance estimator, sharable multiradio timing module, resource allocator, performance adjuster, protocol level hardware control, and a hardware abstraction layer in the wireless communications device are embodied as a cognitive platform control stack and along with the hardware manager, are embodied in program code as a virtualization stack in a memory of the wireless device.

12. The apparatus of claim 11, further comprising:

the hardware abstraction layer is implemented in program code between the physical sharable multiradio hardware components and the protocol level hardware control program code to hide details in hardware from the protocol level hardware control, so that the upper layers of the cognitive platform control stack do not need to be changed to run different sharable multiradio hardware components.

* * * * *